United States Patent
Bae et al.

(10) Patent No.: US 12,452,004 B2
(45) Date of Patent: Oct. 21, 2025

(54) METHOD AND USER EQUIPMENT FOR TRANSMITTING HARQ-ACK INFORMATION, AND BASE STATION FOR RECEIVING HARQ-ACK INFORMATION

(71) Applicant: LG ELECTRONICS INC., Seoul (KR)

(72) Inventors: Duckhyun Bae, Seoul (KR); Suckchel Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 433 days.

(21) Appl. No.: 18/048,603

(22) Filed: Oct. 21, 2022

(65) Prior Publication Data

US 2023/0261807 A1    Aug. 17, 2023

(30) Foreign Application Priority Data

Feb. 11, 2022    (KR) .................. 10-2022-0018266

(51) Int. Cl.
| | |
|---|---|
| *H04W 4/00* | (2018.01) |
| *H04L 1/1812* | (2023.01) |
| *H04L 1/1829* | (2023.01) |
| *H04L 1/1867* | (2023.01) |
| *H04L 5/00* | (2006.01) |
| *H04W 72/21* | (2023.01) |
| *H04W 72/23* | (2023.01) |

(52) U.S. Cl.
CPC .......... *H04L 1/1887* (2013.01); *H04L 1/1812* (2013.01); *H04L 1/1861* (2013.01); *H04L 5/0055* (2013.01); *H04W 72/21* (2023.01); *H04W 72/23* (2023.01)

(58) Field of Classification Search
None
See application file for complete search history.

(56) References Cited

U.S. PATENT DOCUMENTS 11,984,987 B2 *    5/2024    Islam ................... H04L 1/1864

OTHER PUBLICATIONS

European Patent Office Application Serial No. 22207270.4, Search Report dated Jul. 7, 2023, 11 pages.
Moderator (Nokia), "Feature lead summary #3 on HARQ-ACK feedback enhancements for NR Rel-17 URLLC/IIoT (AI 8.3.1.1)," R1-2007216, 3GPP TSG-RAN WG1 Meeting #102-e, e-Meeting, Aug. 2020, 101 pages.
Panasonic, "Discussion on UE feedback enhancements for HARQ-ACK," R1-2105188, 3GPP TSG RAN WG1 #105-e, e-Meeting, May 2021, 3 pages.

(Continued)

*Primary Examiner* — Zewdu A Beyen
(74) *Attorney, Agent, or Firm* — LEE, HONG, DEGERMAN, KANG & WAIMEY

(57) ABSTRACT

A UE is configured to enable multiplexing of uplink transmissions of different priorities. When a first uplink channel for transmission of first HARQ-ACK information overlaps with a second uplink channel for transmission of second HARQ-ACK information, the UE may drop transmission of the first HARQ-ACK information and transmit the second HARQ-ACK information, based on the second HARQ-ACK information being a HARQ process-based HARQ-ACK codebook.

15 Claims, 16 Drawing Sheets

(56) References Cited

OTHER PUBLICATIONS

FGI et al., "Discussion on UE feedback enhancements for HARQ-ACK," R1-2107296, 3GPP TSG-RAN WG1 Meeting #106-e, e-Meeting, Aug. 2021, 6 pages.

Huawei et al., "UE feedback enhancements for HARQ-ACK," R1-2200037, 3GPP TSG RAN WG1 Meeting #107bis-e, e-Meeting, Jan. 2022, 19 pages.

* cited by examiner

FIG. 17

(Rel-16) Type-3 HARQ-ACK Codebook
- NDI
- CBG

Enhanced Type-3 HARQ-ACK Codebook List
- NDI
- CBG

Enhanced Type-3 HARQ-ACK Codebook 0
    - CC(s)

Enhanced Type-3 HARQ-ACK Codebook 1
    - HARQ process(s)

FIG. 18

(Rel-16) Type-3 HARQ-ACK Codebook
- NDI
- CBG

Enhanced Type-3 HARQ-ACK Codebook 0
- CC(s)
- NDI

Enhanced Type-3 HARQ-ACK Codebook 1
- HARQ process(s)
- NDI
- CBG

METHOD AND USER EQUIPMENT FOR TRANSMITTING HARQ-ACK INFORMATION, AND BASE STATION FOR RECEIVING HARQ-ACK INFORMATION

CROSS-REFERENCE TO RELATED APPLICATION(S)

Pursuant to 35 U.S.C. § 119(a), this application claims the benefit of earlier filing date and right of priority to Korean Patent Application No. 10-2022-0018266, filed on Feb. 11, 2022, the contents of which are all hereby incorporated by reference herein in their entireties.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

In addition, an efficient HARQ feedback scheme considering a time division duplex (TDD) related operation, semi-static scheduling, prioritization, etc. is required.

In addition, considering that cancellation of HARQ-ACK response transmission or inappropriate transmission of a HARQ-ACK response to a BS causes PDSCH retransmission, a method to transmit, to the BS, the HARQ-ACK response, transmission of which is cancelled or is not appropriately performed, is required.

In addition, a method for a BS to adjust the reliability of PUCCH transmission and the payload size of a HARQ-ACK codebook according to a situation is required.

In addition, a method is required to prevent a risk that HARQ-ACK information will be redundantly included in a retransmitted HARQ-ACK codebook during retransmission of a HARQ-ACK codebook.

In addition, a method to preferentially transmit information needed by a BS is required when HARQ-ACK codebook retransmission collides with other HARQ-ACK transmissions or other PUCCH/PUSCH transmissions.

The objects to be achieved with the present disclosure are not limited to what has been particularly described hereinabove and other objects not described herein will be more clearly understood by persons skilled in the art from the following detailed description.

In an aspect of the present disclosure, a method of transmitting hybrid automatic repeat request-acknowledgement (HARQ-ACK) information by a user equipment (UE) in a wireless communication system is provided. The method includes: receiving a configuration for enabling multiplexing of uplink transmissions of different priorities; receiving scheduling information related to a first uplink channel for transmission of first HARQ-ACK information related to a high priority; receiving downlink control information including a request for transmission of second HARQ-ACK information; determining the second HARQ-ACK information based on the downlink control information; determining a second uplink channel for transmission of the second HARQ-ACK information based on the downlink control information; and dropping transmission of the first HARQ-ACK information and transmitting the second HARQ-ACK information, based on the first uplink channel and the second uplink channel overlapping in time and the second HARQ-ACK information being a HARQ process-based HARQ-ACK codebook.

In an aspect of the present disclosure, a user equipment (UE) for transmitting hybrid automatic repeat request-acknowledgement (HARQ-ACK) information in a wireless communication system is provided. The UE includes: at least one transceiver; at least one processor; and at least one computer memory operably connected to the at least one processor and configured to store instructions that, when executed, cause the at least one processor to perform operations. The operations include: receiving a configuration for enabling multiplexing of uplink transmissions of different priorities; receiving scheduling information related to a first uplink channel for transmission of first HARQ-ACK information related to a high priority; receiving downlink control information including a request for transmission of second HARQ-ACK information; determining the second HARQ-ACK information based on the downlink control information; determining a second uplink channel for transmission of the second HARQ-ACK information based on the downlink control information; and dropping transmission of the first HARQ-ACK information and transmitting the second HARQ-ACK information, based on the first uplink channel and the second uplink channel overlapping in time and the second HARQ-ACK information being a HARQ process-based HARQ-ACK codebook.

In an aspect of the present disclosure, a processing device in a wireless communication system is provided. The processing device includes at least one processor; and at least one computer memory operably connected to the at least one processor and configured to store instructions that, when executed, cause the at least one processor to perform operations. The operations include: receiving a configuration for enabling multiplexing of uplink transmissions of different priorities; receiving scheduling information related to a first uplink channel for transmission of first HARQ-ACK information related to a high priority; receiving downlink control information including a request for transmission of second HARQ-ACK information; determining the second HARQ-ACK information based on the downlink control information; determining a second uplink channel for transmission of the second HARQ-ACK information based on the downlink control information; and dropping transmission of the first HARQ-ACK information and transmitting the second HARQ-ACK information, based on the first uplink channel and the second uplink channel overlapping in time and the second HARQ-ACK information being a HARQ process-based HARQ-ACK codebook.

In an aspect of the present disclosure, a computer-readable storage medium is provided. The computer-readable storage medium stores at least one computer program including instructions that, when executed by at least one processor, cause the at least one processor to perform operations for a user equipment (UE). The operations include: receiving a configuration for enabling multiplexing of uplink transmissions of different priorities; receiving scheduling information related to a first uplink channel for transmission of first HARQ-ACK information related to a high priority; receiving downlink control information including a request for transmission of second HARQ-ACK information; determining the second HARQ-ACK information based on the downlink control information; determining a second uplink channel for transmission of the second HARQ-ACK information based on the downlink control information; and dropping transmission of the first HARQ-ACK information and transmitting the second HARQ-ACK information, based on the first uplink channel and the second uplink channel overlapping in time and the second HARQ-ACK information being a HARQ process-based HARQ-ACK codebook.

In an aspect of the present disclosure, a computer program stored in a computer-readable storage medium is provided. The computer program includes at one program code including instructions that, when executed, cause at least one processor to perform operations. The operations include: receiving a configuration for enabling multiplexing of uplink transmissions of different priorities; receiving scheduling information related to a first uplink channel for transmission of first HARQ-ACK information related to a high priority; receiving downlink control information including a request for transmission of second HARQ-ACK information; determining the second HARQ-ACK information based on the downlink control information; determining a second uplink channel for transmission of the second HARQ-ACK information based on the downlink control information; and dropping transmission of the first HARQ-ACK information and transmitting the second HARQ-ACK information, based on the first uplink channel and the second uplink channel overlapping in time and the second HARQ-ACK information being a HARQ process-based HARQ-ACK codebook.

In an aspect of the present disclosure, a method of receiving hybrid automatic repeat request-acknowledgement (HARQ-ACK) information by a base station (BS) from a user equipment (UE) in a wireless communication system is provided. The method include: transmitting a configuration for enabling multiplexing of uplink transmissions of different priorities to the UE; transmitting scheduling information related to a first uplink channel for first HARQ-ACK information related to a high priority to the UE; transmitting downlink control information including a request for second HARQ-ACK information to the UE; determining a second uplink channel for the second HARQ-ACK information based on the downlink control information; and omitting reception of the first HARQ-ACK information and receiving the second HARQ-ACK information, based on the first uplink channel and the second uplink channel overlapping in time and the second HARQ-ACK information being a HARQ process-based HARQ-ACK codebook.

In an aspect of the present disclosure, a base station (BS) for receiving hybrid automatic repeat request-acknowledgement (HARQ-ACK) information in a wireless communication system is provided. The BS includes: at least one transceiver; at least one processor; and at least one computer memory operably connected to the at least one processor and configured to store instructions that, when executed, cause the at least one processor to perform operations. The operations include: transmitting a configuration for enabling multiplexing of uplink transmissions of different priorities to the UE; transmitting scheduling information related to a first uplink channel for first HARQ-ACK information related to a high priority to the UE; transmitting downlink control information including a request for second HARQ-ACK information to the UE; determining a second uplink channel for the second HARQ-ACK information based on the downlink control information; and omitting reception of the first HARQ-ACK information and receiving the second HARQ-ACK information, based on the first uplink channel and the second uplink channel overlapping in time and the second HARQ-ACK information being a HARQ process-based HARQ-ACK codebook.

In each aspect of the present disclosure, uplink control information including the first HARQ-ACK information and the second HARQ-ACK information may be transmitted to the BS by the UE, based on the first uplink channel and the second uplink channel overlapping in time and the second HARQ-ACK information being not the HARQ process-based HARQ-ACK codebook.

In each aspect of the present disclosure, dropping transmission of the first HARQ-ACK information by the UE or omitting reception of the first HARQ-ACK information by the BS, based on the first uplink channel and the second uplink channel overlapping in time and the second HARQ-ACK information being the HARQ process-based HARQ-ACK codebook, may be performed based on the HARQ process-based HARQ-ACK codebook including HARQ-ACK information for all HARQ processes configured for the UE.

In each aspect of the present disclosure, dropping transmission of the first HARQ-ACK information and transmitting the second HARQ-ACK information by the UE or omitting reception of the first HARQ-ACK information and receiving the second HARQ-ACK information by the BS, based on the first uplink channel and the second uplink channel overlapping in time and the second HARQ-ACK information being the HARQ process-based HARQ-ACK codebook, may be performed in a state in which the HARQ process-based HARQ-ACK codebook is related to a low priority.

In each aspect of the present disclosure, a configuration for different HARQ-ACK codebooks related respectively to sets of different HARQ processes may be provided to the UE by the BS. The HARQ process-based HARQ-ACK codebook may be one of the different HARQ-ACK codebooks.

The foregoing solutions are merely a part of the examples of the present disclosure and various examples into which the technical features of the present disclosure are incorporated may be derived and understood by persons skilled in the art from the following detailed description.

According to some implementations of the present disclosure, a wireless communication signal may be efficiently transmitted/received. Accordingly, the total throughput of a wireless communication system may be raised.

According to some implementations of the present disclosure, various services with different requirements may be efficiently supported in a wireless communication system.

According to some implementations of the present disclosure, delay/latency generated during radio communication between communication devices may be reduced.

According to some implementation(s) of the present disclosure, HARQ-ACK information, transmission of which is cancelled or reception of which is not appropriately performed by a BS, may be provided to the BS at the request of the BS.

According to some implementation(s) of the present disclosure, the reliability of PUCCH transmission may be adjusted and the payload size of a HARQ-ACK codebook may be adjusted to be suitable for purpose/usage thereof.

According to some implementation(s) of the present disclosure, signaling overhead related to HARQ-ACK retransmission may be reduced.

In addition, when HARQ-ACK codebook retransmission collides with other HARQ-ACK transmissions or other PUCCH/PUSCH transmissions, information required by a BS may be preferentially provided to the BS.

The effects according to the present disclosure are not limited to what has been particularly described hereinabove and other effects not described herein will be more clearly understood by persons skilled in the art related to the present disclosure from the following detailed description.

BRIEF DESCRIPTION OF DRAWINGS

The accompanying drawings, which are included to provide a further understanding of the present disclosure, illustrate examples of implementations of the present disclosure and together with the detailed description serve to explain implementations of the present disclosure:

FIGS. 17 to 19 illustrate HARQ process-based HARQ-ACK codebook configurations according to some implementations of the present disclosure.

DETAILED DESCRIPTION

Figure 1:
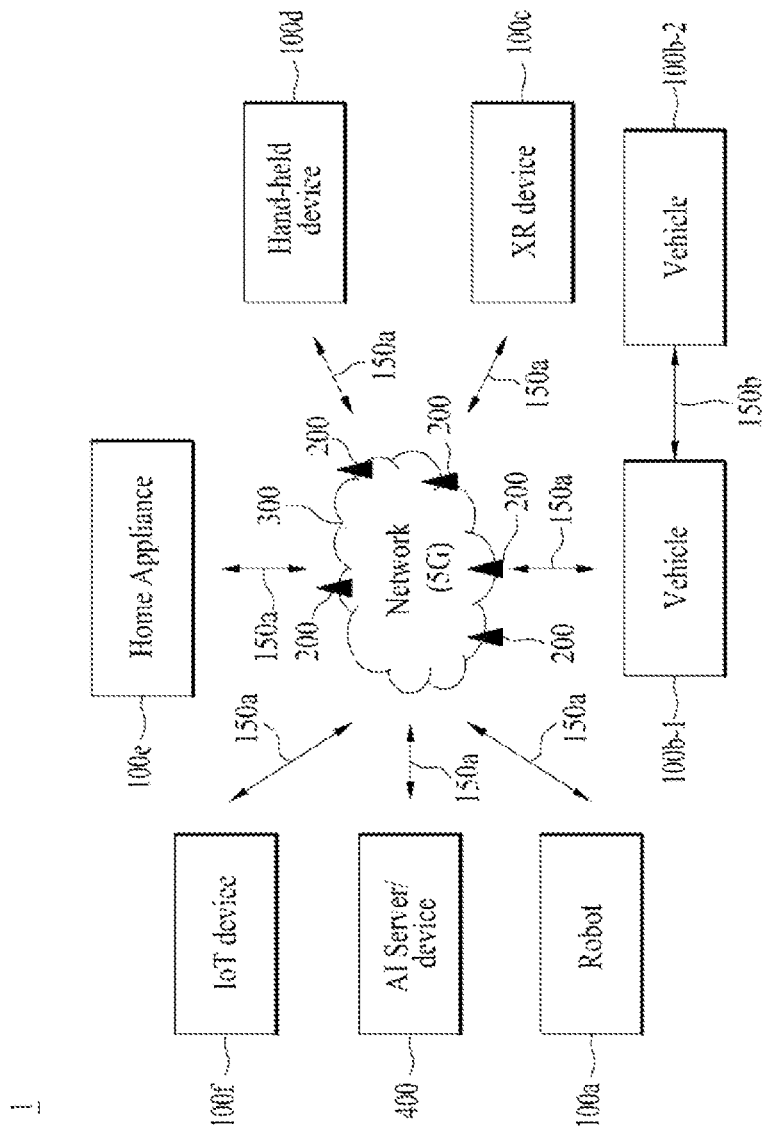
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term special cell (SpCell) refers to the Pcell of a master cell group (MCG) or the primary secondary cell (PSCell) of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a primary secondary cell (PSCell) and 0 or more Scells. PSCell is a primary Scell of an SCG. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group (also referred to as a primary PUCCH group), which includes the Pcell and 0 or more Scells, and an Scell PUCCH group (also referred to as a secondary PUCCH group), which includes only Scell(s). For the Scells, an Scell on which a PUCCH associated with the corresponding cell is transmitted (hereinafter, PUCCH Scell) may be configured. An Scell for which the PUCCH Scell is indicated belongs to an Scell PUCCH group (i.e., secondary PUCCH group) and PUCCH transmission of related UCI is performed on the PUCCH Scell. An Scell for which the PUCCH Scell is not indicated or a cell indicated as a PUCCH transmission cell is a Pcell belongs to the Pcell PUCCH group (i.e., primary PUCCH group) and PUCCH transmission of related UCI is performed on the Pcell. Hereinafter, if the UE is configured with an SCG and some implementations of the present disclosure related to a PUCCH are applied to the SCG, the primary cell may refer to a PSCell of the SCG. If the UE is configured with the PUCCH Scell and some implementations of the present disclosure related to the PUCCH are applied to the secondary PUCCH group, a primary cell may refer to the PUCCH Scell of the secondary PUCCH group.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements (REs)) that carry downlink control information (DCI), and the PDSCH refers to a set of time-frequency resources that carry DL data. The PUCCH, PUSCH, and PRACH refer to a set of time-frequency resources that is a set of time-frequency that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In this specification, a radio resource (e.g., a time-frequency resource) scheduled or configured to the UE by the BS for transmission or reception of the PUCCH/PUSCH/PDSCH may be referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100*a*, vehicles 100*b*-1 and 100*b*-2, an extended reality (XR) device 100*c*, a hand-held device 100*d*, a home appliance 100*e*, an Internet of Things (IoT) device 100*f*, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100*a* to 100*f* may be connected to a network 300 via BSs 200. AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a* and 150*b* may be established between the wireless devices 100*a* to 100*f* and the BSs 200 and between the wireless devices 100*a* to 100*f*). Here, the wireless communication/connections such as UL/DL communication 150*a* and sidelink communication 150*b* (or, device-to-device (D2D) communication) may be established by various RATs (e.g., 5G NR). The wireless devices and the BSs/wireless devices may transmit/receive radio signals to/from each other through the wireless communication/connections 150*a* and 150*b*. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
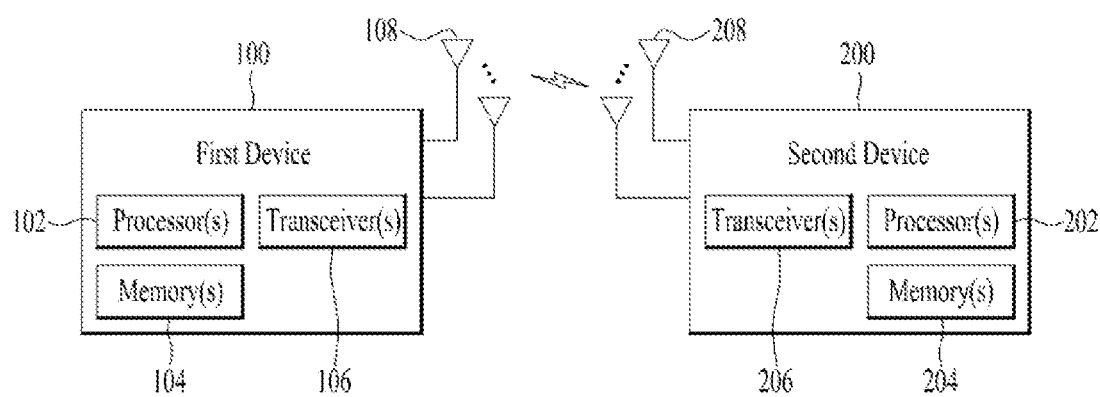
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100*x* and the BS 200} and/or {the wireless device 100*x* and the wireless device 100*x*} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
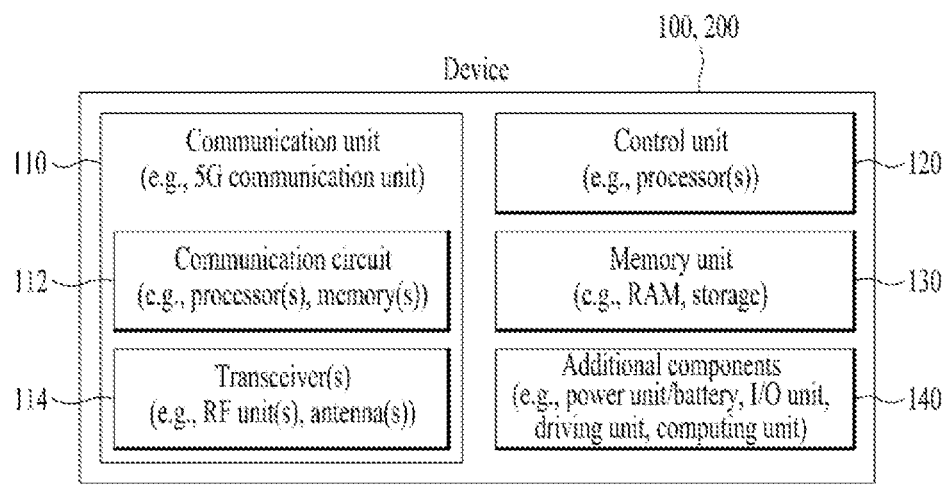
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
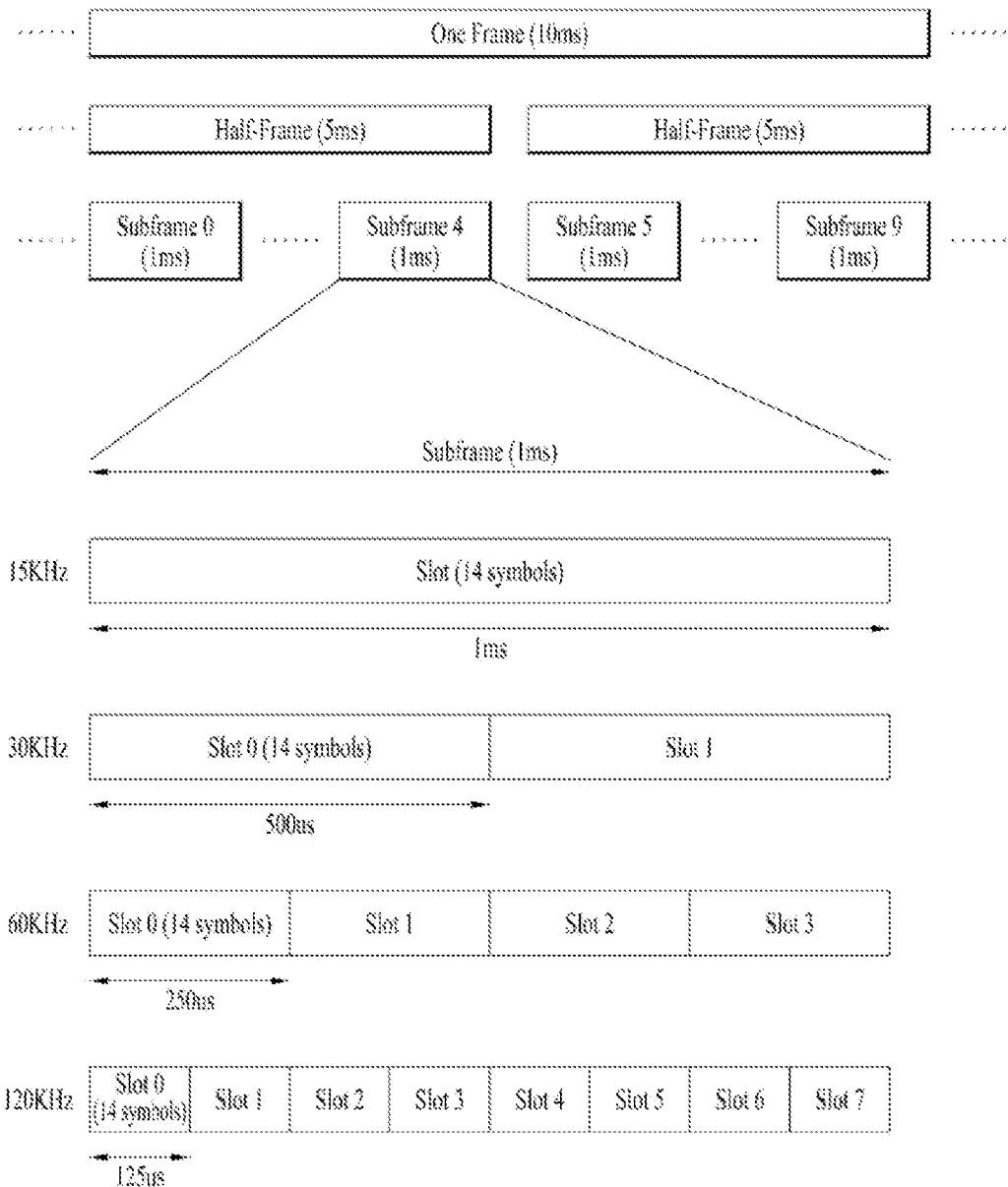
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f = (\Delta f_{max} * N_f / 100) * T_c = 10$ ms and is divided into two half-frames of 5 ms each. A basic time unit for NR is $T_c = 1/(\Delta f_{max} * N_f)$ where $\Delta f_{max} = 480*10^3$ Hz and $N_f = 4096$. For reference, a basic time unit for LTE is $T_s = 1/(\Delta f_{ref} * N_{f,ref})$ where $\Delta f_{ref} = 15*10^3$ Hz and $N_{f,ref} = 2048$. $T_c$ and $T_f$ have the relationship of a constant $\kappa = T_s/T_f = 64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframem,u}_{slot}$) per subframe.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u * 15$ kHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

Figure 5:
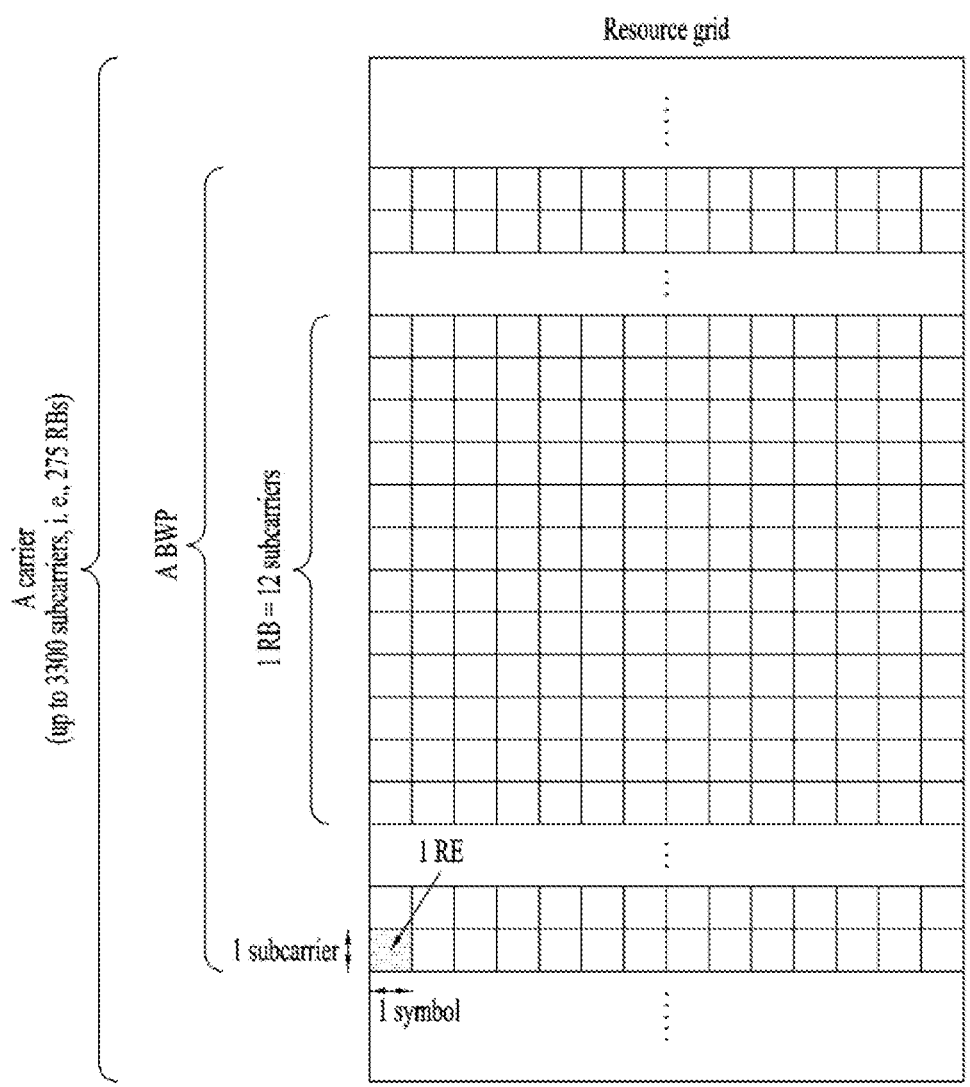
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB} = n^u_{CRB} + N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided the following parameters for the serving cell: i) an SCS; ii) a CP; iii) a CRB $N^{start}_{BWP} = O_{carrier} + RB_{start}$ and the number of contiguous RBs $N^{size}_{BWP} = L_{RB}$ provided by an RRC parameter locationAndBandwidth, which indicates an offset $RB_{set}$ and a length $L_{RB}$ as a resource indicator value (MV) on the assumption of $N^{start}_{BWP} = 275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to non-interleaved mapping. In some implementations, VRB n may be mapped to PRB n for non-interleaved VRB-to-PRB mapping.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

Figure 6:
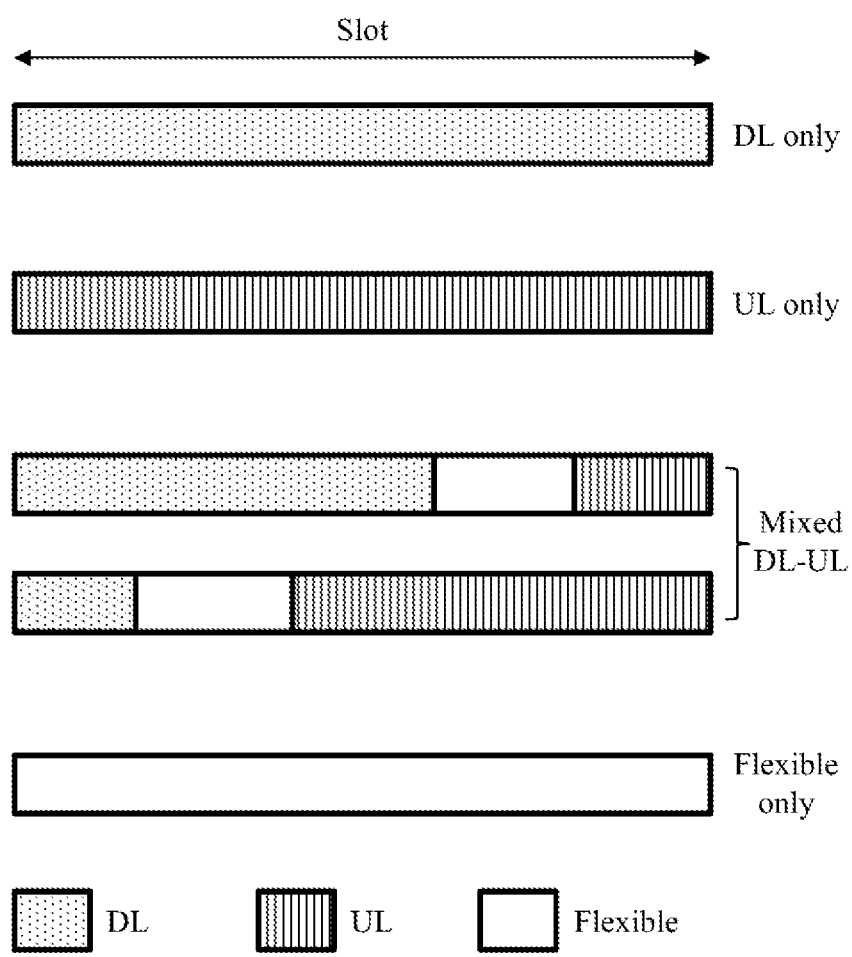
FIG. 6 illustrates slot structures used in a 3GPP-based system.

FIG. 6 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data. Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:

dl-UL-TransmissionPeriodicity that provides a periodicity of the DL-UL pattern;

nrofDownlinkSlots that provides the number of consecutive full DL slots at the beginning of each DL-UL pattern, where the full DL slots are slots having only DL symbols;

nrofDownlinkSymbols that provides the number of consecutive DL symbols at the beginning of a slot immediately following the last full DL slot;

nrofUplinkSlots that provides the number of consecutive full UL slots at the end of each DL-UL pattern, where the full UL slots are slots having only UL symbols; and nrofUplinkSymbols that provides the number of consecutive UL symbols in the end of a slot immediately preceding the first full UL slot.

The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

TABLE 3

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | | ... | | | | | | | |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the (start) position of a slot format combination ID (i.e., SFI-index) for a corresponding serving cell in the SFI DCI, a set of slot format combinations applicable to the serving cell, and a reference subcarrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to an radio network temporary identifier (RNTI) used for an SFI and the total length of a DCI payload having CRC scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

If the TDD DL-UL pattern is not configured, the UE determines whether each slot is used for UL or DL and determines symbol allocation in each slot based on the SFI DCI and/or on DCI for scheduling or triggering DL or UL signal transmission (e.g., DCI format 1_0, DCI format 1_1, DCI format 1_2, DCI format 0_0, DCI format 0_1, DCI format 0_2, or DCI format 2_3).

NR frequency bands are defined as two types of frequency ranges, i.e., FR1 and FR2. FR2 is also referred to as millimeter wave (mmW). The following table shows frequency ranges within which NR may operate.

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including resource allocation information on the DL-SCH is called PDSCH scheduling DCI, and DCI including resource allocation information on the UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH is a physical layer UL channel for uplink control information (UCI) transmission. The PUCCH carries UCI. UCI types transmitted on the PUCCH include hybrid automatic repeat request acknowledgement (HARQ-ACK) information, a scheduling request (SR), and channel state information (CSI). UCI bits include HARQ-ACK information bits if present, SR information bits if present, link recovery request (LRR) information bits if present, and CSI bits if present. In the present disclosure, HARQ-ACK information bits correspond to a HARQ-ACK codebook. In particular, a bit sequence in which HARQ-ACK information bits are arranged according to a predetermined rule is called a HARQ-ACK codebook.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (L1). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

Link Recovery Request (LRR)

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH Format 0 (PF0 or F0)
  Supported UCI payload size: up to K bits (e.g., K=2)
  Number of OFDM symbols constituting a single PUCCH: 1 to X symbols (e.g., X=2)
  Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.
  Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)
  Supported UCI payload size: up to K bits (e.g., K=2)
  Number of OFDM symbols constituting a single PUCCH: Y to Z symbols (e.g., Y=4 and Z=14)
  Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.
  Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)
  Supported UCI payload size: more than K bits (e.g., K=2)
  Number of OFDM symbols constituting a single PUCCH: 1 to X symbols (e.g., X=2)
  Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of 1/3. A pseudo noise (PN) sequence is used for a DMRS sequence. Frequency hopping may be activated for 2-symbol PUCCH format 2.
  Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)
  Supported UCI payload size: more than K bits (e.g., K=2)
  Number of OFDM symbols constituting a single PUCCH: Y to Z symbols (e.g., Y=4 and Z=14)
  Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).
  Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)
  Supported UCI payload size: more than K bits (e.g., K=2)
  Number of OFDM symbols constituting a single PUCCH: Y to Z symbols (e.g., Y=4 and Z=14)
  Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.
  Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
| --- | --- | --- | --- | --- |
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2
PUCCH resource set #1, if 2<the number of UCI bits=<$N_1$
...
PUCCH resource set #(K−1), if $N_{K-2}$<the number of UCI bits=<$N_{K-1}$ Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 6).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting control channel element (CCE) index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

Resource Allocation by PDCCH: Dynamic Grant/Assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. HARQ information on a DL-SCH or UL-SCH may include a new information indicator (NDI), transport block size (TBS), redundancy version (RV), and HARQ process ID (i.e., HARQ process number). The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
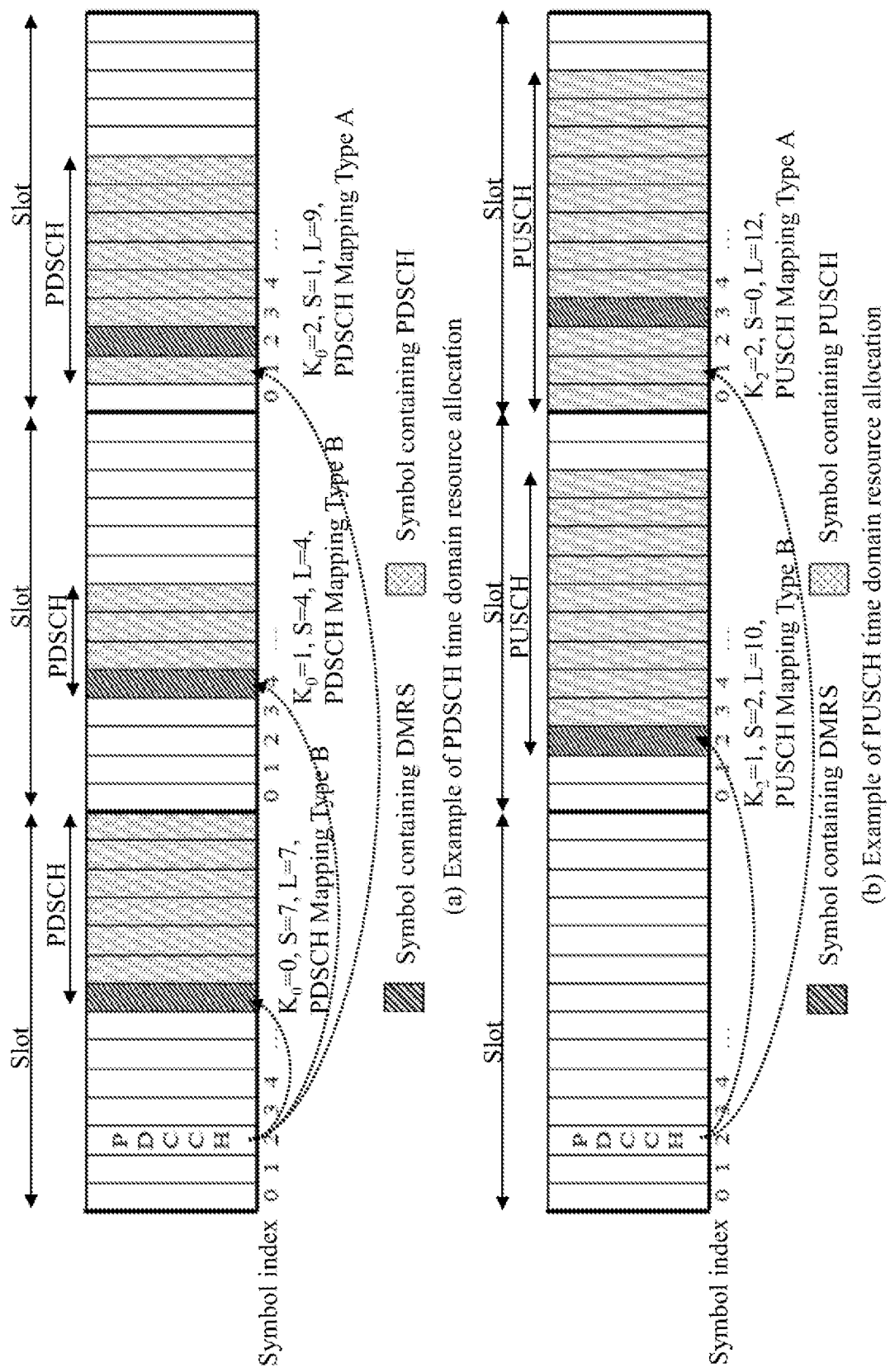
FIG. 7 illustrates an example of physical downlink shared channel (PDSCH) time domain resource assignment (TDRA) caused by a physical downlink control channel (PDCCH) and an example of physical uplink shared channel (PUSCH) TDRA caused by the PDCCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index 5) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index 5) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. There are two PDSCH/PUSCH mapping types: one is mapping type A and the other is mapping type B. In the case of PDSCH/PUSCH mapping type A, a DMRS is mapped to a PDSCH/PUSCH resource with respect to the start of a slot. One or two of the symbols of the PDSCH/PUSCH resource may be used as DMRS symbol(s) according to other DMRS parameters. For example, in the case of PDSCH/PUSCH mapping type A, the DMRS is located in the third symbol (symbol #2) or the fourth symbol (symbol #3) in the slot according to RRC signaling. In the case of PDSCH/PUSCH mapping type B, a DMRS is mapped with respect to the first OFDM symbol of a PDSCH/PUSCH resource. One or two symbols from the first symbol of the PDSCH/PUSCH resource may be used as DMRS symbol(s) according to other DMRS parameters. For example, in the case of PDSCH/PUSCH mapping type B, the DMRS is located at the first symbol allocated for the PDSCH/PUSCH. In the present disclosure, the PDSCH/PUSCH mapping type may be referred to as a mapping type or a DMRS mapping type. For example, in this specification, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:
  cs-RNTI corresponding to a CS-RNTI for retransmission;
  periodicity corresponding to a periodicity of configured grant Type 1;
  timeDomainOffset indicating an offset of a resource with respect to system frame number (SFN)=0 in the time domain;
  timeDomainAllocation value m that provides a row index m+1 pointing to the allocation table, indicating a combination of the start symbol S, the length L, and the PUSCH mapping type;
  frequencyDomainAllocation that provides frequency domain resource allocation; and
  mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIT) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:
  cs-RNTI corresponding to a CS-RNTI for activation, deactivation, and retransmission; and
  periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN*numberOfSlotsPerFrame*numberOfSymbolsPerSlot)+(slot number in the frame*numberOfSymbolsPerSlot)+symbol number in the slot]= [(SFN$_{start\ time}$*numberOfSlotsPerFrame*numberOfSymbolsPerSlot+slot$_{start\ time}$*numberOfSymbolsPerSlot+Symbol$_{start\ time}$) N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset and/or a parameter harq-ProcID-Offset2 used to derive HARQ process IDs for configured UL grants may be further provided by the BS to the UE. harq-ProcID-Offset is an offset of a HARQ process for a configured grant for operation with shared spectrum channel access, and harq-ProcID-Offset2 is an offset of a HARQ process for a configured grant. In the present disclosure, cg-Retransmission Timer is a duration after (re)transmission based on a configured grant in which the UE should not autonomously perform retransmission based on the HARQ process of the (re)transmission. cg-RetransmissionTimer may be provided to the UE by the BS when retransmission on a configured UL grant is configured. For configured grants configured with neither harq-ProcID-Offset nor cg-RetransmissionTimer, the HARQ process ID associated with the first symbol of UL transmission may be derived from the following equation: HARQ Process ID= [floor(CURRENT_symbol/periodicity)] modulo nrof-HARQ-Processes. For configured UL grants with harq-ProcID-Offset2, the HARQ process ID associated with the first symbol of UL transmission may be derived from the following equation: HARQ Process ID=[floor(CURRENT_symbol/periodicity)] modulo nrofHARQ-Processes+harq-ProcID-Offset2, where CURRENT_symbol=(SFN*numberOfSlotsPerFrame*numberOfSymbolsPerSlot+slot number in the frame*numberOfSymbolsPerSlot+symbol number in the slot), and numberOfSlotsPerFrame and numberOfSymbolsPerSlot denote the number of consecutive slots per frame and the number of consecutive OFDM symbols per slot, respectively. For configured UL grants with cg-RetransmissionTimer, the UE may select a HARQ process ID from among HARQ process IDs available for the configured grant configuration.

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling used to configure a semi-persistent transmission:

cs-RNTI corresponding to a CS-RNTI for activation, deactivation, and retransmission;

nrofHARQ-Processes that provides the number of HARQ processes for SPS;

periodicity that provides a periodicity of configured DL assignment for SPS;

n1PUCCH-AN that provides a HARQ resource for a PUCCH for SPS (the network configures the HARQ resource as format 0 or format 1, and the actual PUCCH resource is configured by PUCCH-Config and referred to in n1PUCCH-AN by the ID thereof).

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+slot$_{start\ time}$) N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset used to derive HARQ process IDs for configured DL assignments may be further provided by the BS to the UE. harq-ProcID-Offset is an offset of a HARQ process for SPS. For configured DL assignments without harq-ProcID-Offset, a HARQ process ID associated with a slot in which DL transmission starts may be determined from the following equation: HARQ Process ID=[floor (CURRENT_slot*10/(numberOfSlotsPerFrame*periodicity))] modulo nrof-HARQ-Processes, where CURRENT_slot= [(SFN*numberOfSlotsPerFrame)+slot number in the frame], and numberOfSlotsPerFrame denotes the number of consecutive slots per frame. For configured DL assignments with harq-ProcID-Offset, a HARQ process ID associated with a slot in which DL transmission starts may be determined from the following equation: HARQ Process ID= [floor (CURRENT_slot/periodicity)] modulo nrofHARQ-Processes+harq-ProcID-Offset, where CURRENT_slot= [(SFN*numberOfSlotsPerFrame)+slot number in the frame], and numberOfSlotsPerFrame denotes the number of consecutive slots per frame.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 7 and Table 8. Table 7 shows an example of special fields for DL SPS and UL grant Type 2 scheduling activation PDCCH validation, and Table 8 shows an example of special fields for DL SPS and UL grant Type 2 scheduling release PDCCH validation.

TABLE 6

|  | DCI format 0_0/0_1 | DCI format 1_0 | DCI format 1_1 |
|---|---|---|---|
| HARQ process number | set to all 0's | set to all 0's | set to all 0's |
| Redundancy version | set to '00' | set to '00' | For the enabled transport block: set to '00' |

TABLE 7

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

In the present disclosure, a PDSCH based on DL SPS may be referred to as an SPS PDSCH, and a PUSCH based on a UL configured grant (CG) may be referred to as a CG PUSCH. A PDSCH dynamically scheduled by DCI carried on a PDCCH may be referred to as a dynamic grant (DG) PDSCH, and a PUSCH dynamically scheduled by DCI carried by on a PDCCH may be referred to as a DG PUSCH.

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides parameters (e.g., CORESET #0 configuration) for monitoring a PDCCH for scheduling a PDSCH carrying system information block 1 (SIB1) to the UE. The PBCH may also indicate that there is no associated SIB1. In this case, the UE may be provided with not only a frequency range in which the UE may assume that there is no SSB associated with SSB1 but also other frequencies to search for an SSB associated with SIB1. CORESET #0, which is a CORESET for scheduling SIB1 at least, may be configured by the MIB or dedicated RRC signaling.

A set of PDCCH candidates monitored by the UE is defined in terms of PDCCH search space sets. The search space set may be a common search space (CSS) set or a UE-specific search space (USS) set. Each CORESET configuration is associated with one or more search space sets, and each search space set is associated with one CORESET configuration. The search space set is determined based on the following parameters provided by the BS to the UE.

controlResourceSetID: an identifier for identifying a CORESET p associated with a search space set s.

monitoringSlotPeriodicityAndOffset: a PDCCH monitoring periodicity of slots $k_s$ and a PDCCH monitoring offset of $o_s$ slots to configure slots for PDCCH monitoring.

duration: a duration of $T_s < k_s$ slots indicating a number of slots in which the search space set s exists.

monitoringSymbolsWithinSlot: a PDCCH monitoring pattern within a slot, indicating first symbol(s) of the CORESET within a slot for PDCCH monitoring.

nrofCandidates: a number of PDCCH candidates per CCE aggregation level.

searchSpaceType: an indication that search space set s is either a CSS set or a USS set.

The parameter monitoringSymbolsWithinSlot may indicate the first symbol(s) for PDCCH monitoring in the slots configured for PDCCH monitoring (e.g., see monitoringSlotPeriodicityAndOffset and duration). For example, if monitoringSymbolsWithinSlot is configured with 14 bits, the most significant (left) bit represents the first OFDM symbol of a slot, and the second most significant (left) bit represents the second OFDM symbol of the slot. In this way, the bits of monitoringSymbolsWithinSlot may represent 14 OFDM symbols of the slot, respectively. For example, among the bits of monitoringSymbolsWithinSlot, bit(s) set to 1 may identify the first symbol(s) of a CORESET in a slot.

A UE monitors PDCCH candidates in PDCCH monitoring occasions only. The UE determines a monitoring occasion on an active DL BWP from the PDCCH monitoring periodicity, the PDCCH monitoring offset, and the PDCCH monitoring pattern within a slot. In some implementations, for search space set s, the UE determines that a PDCCH monitoring occasion(s) existing in a slot with number $n^u_{s,f}$ in a frame with number of if $(n_f * N^{frame,u}_{slot} + n^u_{s,f} - o_s)$ mod $k_s = 0$. The UE monitors PDCCH candidates for search space set s for $T_s$ consecutive slots, starting from slot $n^u_{s,f}$ and does not monitor PDCCH candidates for search space set s for the next $k_s - T_s$.

The following table shows search space sets, related RNTIs, and use cases thereof.

TABLE 8

| Search Space Set | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

The following table shows DCI formats carried by a PDCCH.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbols(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of PRB(s) and OFDM symbol(s) where UE cancels the corresponding UL transmission from the UE |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. For a CSS, DCI format 0_0 and DCI format 1_0 have fixed sizes after the BWP size is initially given by RRC. For a USS, DCI format 0_0 and DCI format 1_0 are fixed in size in fields other than a frequency domain resource assignment (FDRA) field, and the FDRA field may vary in size by configuration of a related parameter by the BS. In DCI format 0_1 and DCI format 1_1, the size of the DCI field may be changed by various RRC reconfigurations by the BS. DCI format 2_0 may be used to provide dynamic slot format information (e.g., SFI DCI) to the UE, DCI format 2_1 may be used to provide DL pre-emption information to the UE, and DCI format 2_4 may be used to indicate a UL resource on which the UE needs to cancel UL transmission.

A wireless communication system to which some implementations of the present disclosure are applicable (e.g., a 3GPP-based wireless communication system) supports HARQ, which is a combination of retransmission and error correction. If an error in packet transmission is detected, packet retransmission is requested and a receiver attempts to decode the packet based on previous and current transmissions. In the wireless communication system to which some implementations of the present disclosure are applicable, HARQ operates at a MAC layer and a PHY layer. HARQ is a stop-and-wait protocol which transmits no other packets while waiting for feedback on a current packet. Such a protocol results in inefficient use of radio resources due to a round trip time. The 3GPP-based wireless communication system solves this problem by allowing multiple concurrent HARQ processes. Each HARQ process may have one packet waiting for ACK. On both DL and UL, the UE may support up to a predetermined number of HARQ processes (e.g., 16 HARQ processes) per cell. Each HARQ process generally handles one TB at a time. However, if DL spatial multiplexing is configured, each HARQ process may handle two TBs at a time. For example, if the UE is configured with the maximum number of codewords that a single DCI may schedule being 1, the number of TBs associated with one HARQ process is 1. If the UE is configured with the maximum number of codewords that the single DCI may schedule being 2, the number of TBs associated with one HARQ process is 2. Upon receiving a retransmitted TB, the receiver may decode the retransmitted TB by combining the current and previous transmissions of the TB. In some scenarios, the TB may be very large. If the TB is very large, retransmission of the entire TB even when there are errors in only a few bits wastes radio resources. Therefore, in some scenarios (e.g., 5G NR), CBG-level retransmission has been introduced. When a CRC-attached TB is larger than a certain size, the CRC-attached TB is segmented into smaller units called code blocks. A CRC of each code block is attached to the code block. Since transmitting HARQ-ACK for each code block causes excessive signaling, CBG-level HARQ feedback is being considered in which 2/4/6/8 code blocks are grouped into CBGs and HARQ feedback for each CBG is transmitted. Upon receiving CBG-level HARQ feedback from the receiver, a transmitter that has transmitted a TB may retransmit only a CBG requiring retransmission to the receiver, rather than retransmitting the entire TB. A TB may have one or multiple CBGs and each CBG may have one or more code blocks. In the case of TB-level HARQ feedback, one HARQ-ACK information bit may be transmitted per TB and, in the case of CBG-level HARQ feedback, one HARQ-ACK information bit may be transmitted per CBG.

Figures 8, 9:
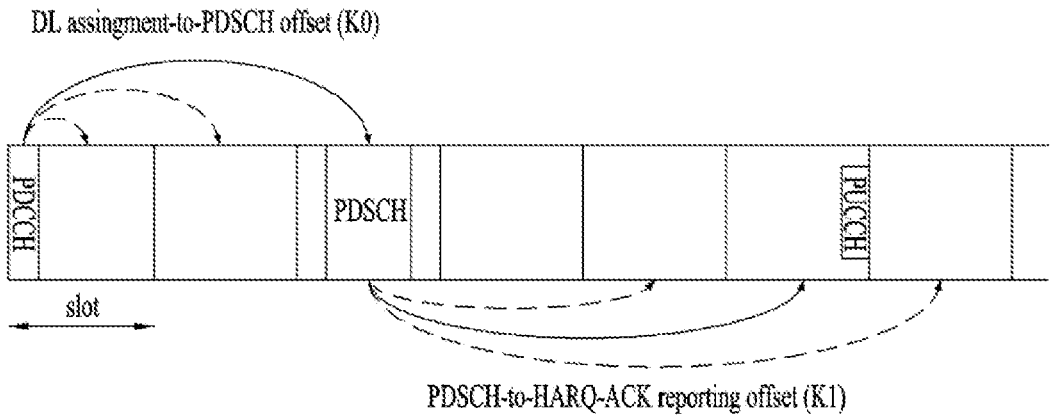
FIG. 8 illustrates a hybrid automatic repeat request-acknowledgement (HARQ-ACK) transmission/reception procedure.
FIG. 9 illustrates an example of a HARQ process-based HARQ-ACK codebook according to some implementations of the present disclosure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH. In some scenarios, PUCCH feedback based on a subslot including fewer OFDM symbols (e.g., 2 to 7 OFDM symbols) than 14 OFDM symbols as well as PUCCH feedback based on a subslot including 14 OFDM symbols may be performed.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as i) a semi-static HARQ-ACK codebook, ii) a dynamic HARQ-ACK codebook and iii) HARQ process based HARQ-ACK codebook, according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n-k). For example, when k∈{1, 2, 3, 4, 5, 6, 7, 8}, the HARQ-ACK information of slot #n may include HARQ-ACK corresponding to slot #(n−8) to slot #(n−1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. The semi-static HARQ-ACK codebook is referred to as a Type-1 HARQ-ACK codebook. For the Type-1 HARQ-ACK codebook, the number of bits to be transmitted in a HARQ-ACK report is fixed and may be potentially large. If many cells are configured but only few cells are scheduled, the Type-1 HARQ-ACK codebook may be inefficient.

In the case of the dynamic HARQ-ACK codebook, the HARQ-ACK payload size that the UE is to report may be dynamically changed by the DCI etc. The dynamic HARQ-ACK codebook is referred to as a Type-2 HARQ-ACK codebook. The Type-2 HARQ-ACK codebook may be considered as optimized HARQ-ACK feedback because the UE sends feedback only for scheduled serving cells. However, in poor channel conditions, the UE may erroneously determine the number of scheduled serving cells. To solve this problem, a downlink assignment index (DAI) may be included as a part of DCI. For example, in the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the case of a HARQ-ACK codebook based on HARQ processes, the HARQ-ACK payload is determined based on all HARQ processes of all configured (or activated) serving cells in a PUCCH group. For example, the size of the HARQ-ACK payload to be reported by the UE using the HARQ-ACK codebook based on HARQ processes may be determined based on the number of all configured or activated serving cells in the PUCCH group configured for the UE and the number of HARQ processes for the serving cells. The HARQ-ACK codebook based on HARQ processes is also referred to as a Type-3 HARQ-ACK codebook. The type-3 HARQ-ACK codebook may be applied to one-shot feedback. For example, if the UE is provided with pdsch-HARQ-ACK-OneShotFeedback through RRC signaling and the UE detects a DCI format including a one-shot HARQ-ACK request field, a value of which is 1, at any PDCCH monitoring occasion, the UE includes HARQ-ACK information in the Type-3 HARQ-ACK codebook.

FIG. 9 illustrates an example of a HARQ process-based HARQ-ACK codebook according to some implementations of the present disclosure. In FIG. 9, "AN" denotes HARQ-ACK information and "HP" denotes a HARQ process.

Referring to FIG. 9, when the number of HARQ processes for Cell #0 is 6, the number of HARQ processes for Cell #1 is 6, and the number of HARQ processes for Cell #2 is 4, a HARQ process-based HARQ-ACK codebook (particularly, Type-3 HARQ-ACK codebook according to 3GPP TS 38.213 Rel-16) is generated to include HARQ-ACK information for each of 6 HARQ processes of Cell #0, 6 HARQ processes of Cell #1, and 4 HARQ processes of Cell #2, regardless of whether a HARQ process is associated with a dynamic PDSCH or an SPS PDSCH.

If the UE is provided with pdsch-HARQ-ACK-CodebookList through RRC signaling, the UE may be indicated by pdsch-HARQ-ACK-CodebookList to generate one or multiple HARQ-ACK codebooks. When the UE is indicated to generate one HARQ-ACK codebook, the HARQ-ACK codebook is associated with a PUCCH of priority index 0. When the UE is provided with pdsch-HARQ-ACK-CodebookList, the UE multiplexes only HARQ-ACK information associated with the same priority index with the same HARQ-ACK codebook. When the UE is indicated to generate two HARQ-ACK codebooks, the first HARQ-ACK codebook is associated with a PUCCH of priority index 0, and the second HARQ-ACK codebook is associated with a PUCCH of priority index 1.

The unit of the time difference (e.g., a PDSCH-to-HARQ feedback timing indicator) from a DL data channel to a PUCCH for HARQ-ACK feedback transmission may be determined by a predetermined subslot length (e.g., the number of symbols included in a subslot). For example, the unit of the time difference from the DL data channel to the PUCCH for HARQ-ACK feedback transmission may be configured by a parameter subslotLengthForPUCCH in PUCCH-Config, which is configuration information used to configure UE-specific PUCCH parameters. According to these scenarios, the length unit of the PDSCH-to-HARQ feedback timing indicator may be configured for each HARQ-ACK codebook.

When a plurality of UL channels overlap within a predetermined time interval, a method for the UE to handle the plurality of UL channels should be stipulated in order to allow the BS to properly receive the UL channel(s) transmitted by the UE. Hereinbelow, methods of handling collision between UL channels will be described.

Figure 10:
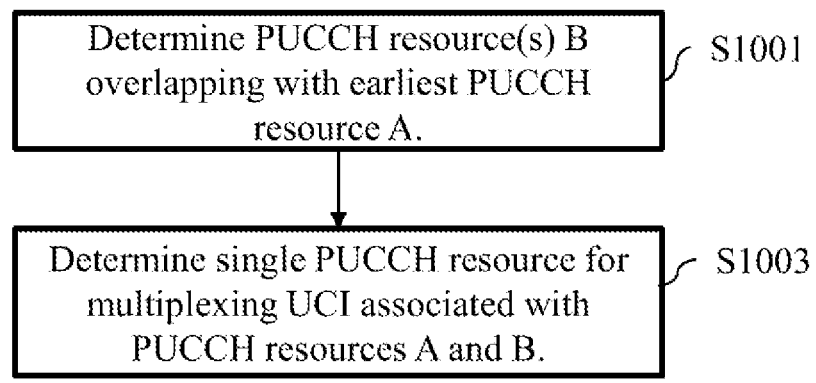
FIG. 10 illustrates an example of a process for a UE with overlapping PUCCHs in a single slot to handle collision between UL channels.

FIG. 10 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S1001). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S1003). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to-HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 11:
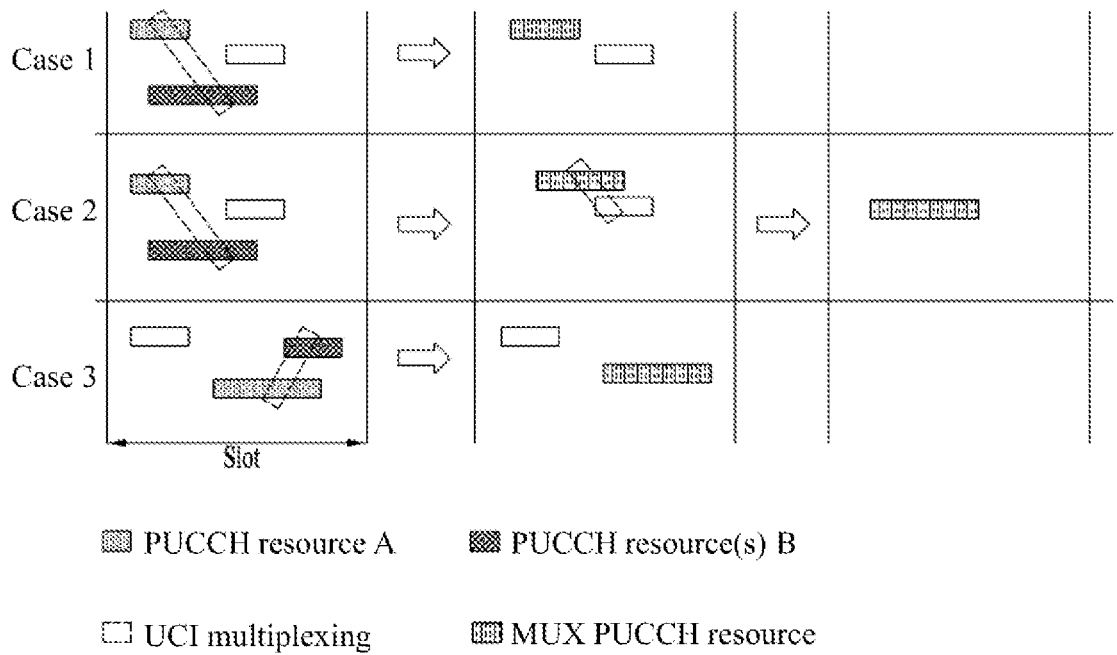
FIG. 11 illustrates cases for performing UCI multiplexing based on FIG. 10.

FIG. 11 illustrates cases for performing UCI multiplexing based on FIG. 10. Referring to FIG. 11, when a plurality of PUCCH resources overlap in a slot, UCI multiplexing may be performed based on the earliest PUCCH resource A (e.g., PUCCH resource A with the earliest start symbol). In FIG. 11, Case 1 and Case 2 show that the first PUCCH resource overlaps with another PUCCH resource. In this case, the process of FIG. 10 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 10 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 10 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 12:
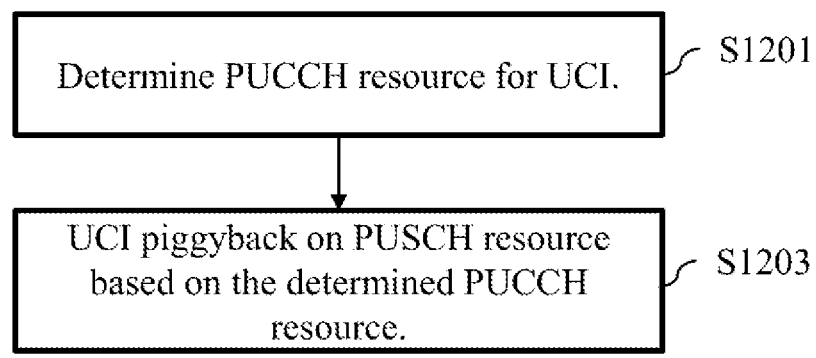
FIG. 12 illustrates an example of a process for a UE with an overlapping PUCCH and PUSCH in a single slot to handle collision between UL channels.

FIG. 12 illustrates an example of a process for a UE with an overlapping PUCCH and PUSCH in a single slot to handle collision between UL channels.

For UCI transmission, the UE may determine a PUCCH resource (S1201). Determining the PUCCH resource for UCI may include determining a MUX PUCCH resource. In other words, determining the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1203). For example, when a PUSCH resource (on which multiplexed UCI transmission is allowed) is present, the UE may apply a UCI multiplexing rule to PUCCH resource(s) overlapping with the PUSCH resource (on the time axis). The UE may transmit UCI through a PUSCH.

If there is no PUSCH overlapping the determined PUCCH resource in the slot, S1203 may be skipped and the UCI may be transmitted through the PUCCH.

Meanwhile, when the determined PUCCH resource overlaps with a plurality of PUSCHs on the time axis, the UE may multiplex the UCI on one of the plurality of PUSCHs. For example, when the UE intends to transmit the plurality of PUSCHs on respective serving cells, the UE may multiplex the UCI on a PUSCH of a specific serving cell (e.g., a serving cell having the smallest serving cell index) among the serving cells. If there is more than one PUSCH in the slot on the specific serving cell, the UE may multiplex the UCI on the earliest PUSCH transmitted in the slot.

Figure 13:
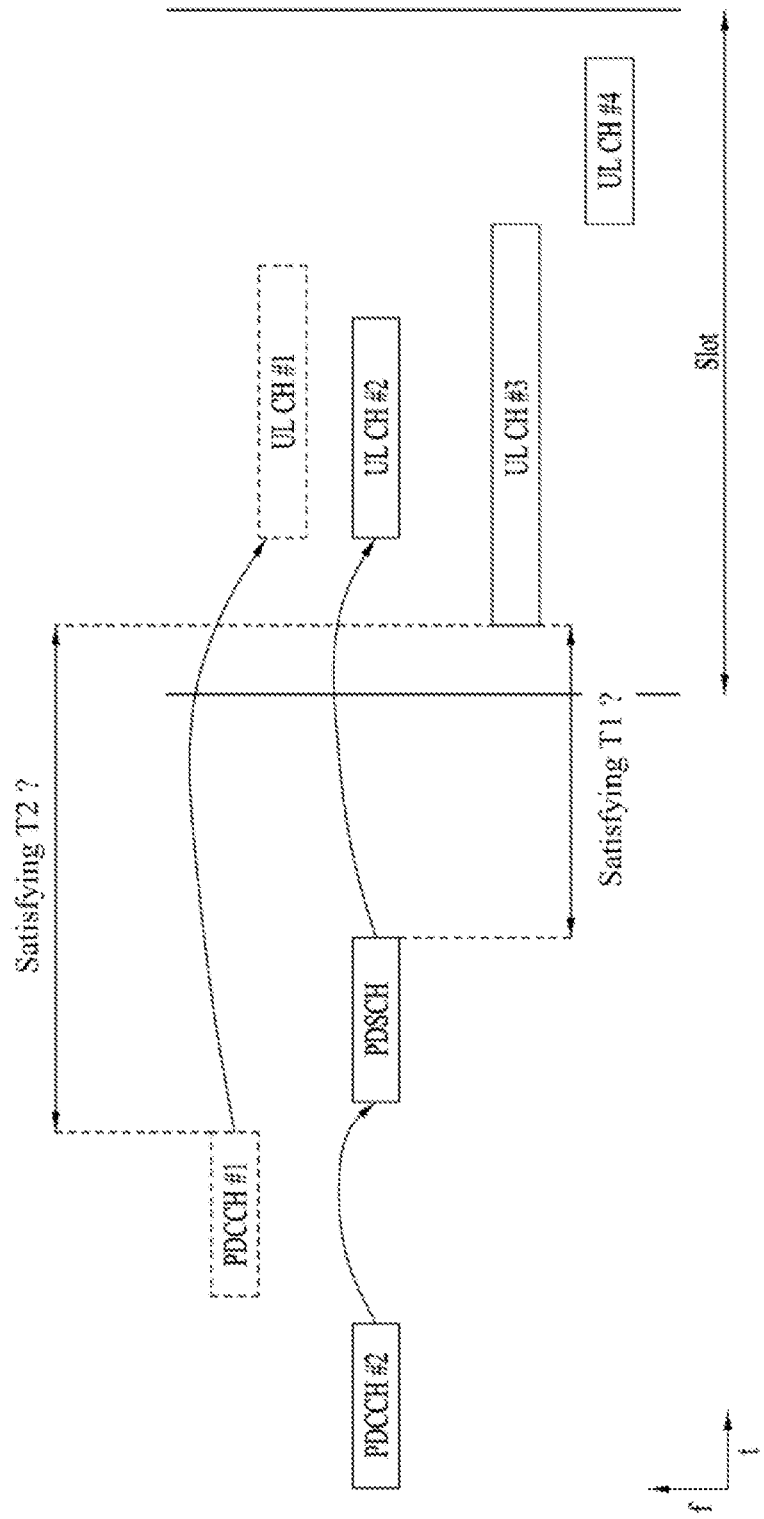
FIG. 13 illustrates UCI multiplexing considering a timeline condition.

FIG. 13 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time T1 from the start symbol of the earliest channel among the overlapping PUCCH(s) and/or PUSCH(s) (on the time axis). T1 may be determined based on i) a minimum PDSCH processing time N1 defined according to a UE processing capability, and/or ii) $d_{1,1}$ predefined as an integer equal to or greater than 0 according to a position of scheduled symbol(s), PDSCH mapping type, BWP switching, etc.

For example, T1 may be determined as follows: $T1=(N_1+d_{1,1})*(2048+144)*\kappa*2^{-\mu}*T_c+T_{ext}$. $N_i$ is based on u of Table 10 and Table 11 for UE processing capabilities #1 and #2, respectively, and u is one of ($u_{PDCCH}$, $u_{PDSCH}$, $u_{UL}$), that causes the largest T1, where $u_{PDCCH}$ corresponds to a subcarrier spacing of a PDCCH for scheduling the PDSCH, $u_{PDSCH}$ corresponds to a subcarrier spacing of the scheduled PDSCH, $u_{UL}$ corresponds to a subcarrier spacing of a UL channel on which HARQ-ACK is to be transmitted, and $\kappa=T_c/T_f=64$. In Table 10, in the case of $N_{1,0}$, if a PDSCH DMRS position of an added DMRS is $l_1=12$, then $N_{1,0}=14$ and, otherwise, $N_{1,0}=13$ (refer to Section 7.4.1.1.2 of 3GPP TS 38.211). For operation with shared spectrum channel access, $T_{ext}$ may be calculated according to section 5.3.1 of 3GPP TS 38.211, otherwise $T_{ext}$ may be equal to 0. For the PDSCH mapping type A, if the last symbol of PDSCH is on the i-th symbol of the slot where i<7, $d_{1,1}$ may be equal to 7−i, otherwise $d_{1,1}$ may be equal to 0. If a PUCCH of a larger priority index would overlap with PUCCH/PUSCH of a smaller priority index, $d_2$ for the PUCCH of a larger priority may be set as reported by the UE; otherwise $d_2$ may be equal to 0. For UE processing capability #1 and if the PDSCH is mapping type B: if the number of PDSCH symbols allocated is L>=7, then $d_{1,1}$ may be equal to 0, if the number of PDSCH symbols allocated is L>=4, then $d_{1,1}$ may be equal to 7-L, if the number of PDSCH symbols allocated is L=3 then $d_{1,1}$ may be equal to 3+min(d,1), where d is the number of overlapping symbols of the scheduling PDCCH and the scheduled PDSCH, and if the number of PDSCH symbols allocated is 2, then $d_{1,1}$ may be equal to 3+d, where d is the number of overlapping symbols of the scheduling PDCCH and the scheduled PDSCH. For UE processing capability #2 and if the PDSCH is mapping type B: if the number PDSCH symbols allocated is L>=7, then $d_{1,1}$ may be equal to 0, if the number of PDSCH symbols allocated is L>=3 and L<=6, then $d_{1,1}$ may be equal to the number of overlapping symbols of the scheduling PDCCH and the scheduled PDSCH, if the number of PDSCH symbols allocated is 2, if the scheduling PDCCH was in a 3-symbol CORESET and the CORESET and the PDSCH had the same starting symbol then $d_{1,1}$ may be equal to 3, otherwise $d_{1,1}$ may be the number of overlapping symbols of the scheduling PDCCH and the scheduled PDSCH. In the present disclosure T1 may also be referred to as $T_{proc,1}$.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time N1 defined according to a UE PUSCH timing capability, and/or ii) $d_{2,x}$ predefined as an integer equal to or greater than 0 according to the scheduled symbol position, BWP switching, etc. $d_{2,x}$ may be categorized into $d_{2,1}$ related to the position of scheduled symbol(s) and $d_{2,2}$ related to BWP switching.

For example, T2 may be determined as follows: T2=max{$(N_2+d_{2,1})*(2048+144)*\kappa*2^{-u}*T_c+T_{ext}+T_{switch}$, $d_{2,2}$}. $N_2$ is based on u of Table 12 and Table 13 for UE timing capabilities #1 and #2, respectively, and u is one of ($u_{DL}$, $u_{UL}$), that causes the largest T2, where $u_{DL}$ corresponds to a subcarrier spacing of a PDCCH carrying DCI for scheduling a PUSCH, $u_{UL}$ corresponds to a subcarrier spacing of the PUSCH, and $\kappa=T_c/T_f=64$. For operation with shared spectrum channel access, $T_{ext}$ may be calculated according to section 5.3.1 of 3GPP TS 38.211, otherwise $T_{ext}$ may be equal to 0. If the first symbol of the PUSCH allocation consists of DM-RS only, then $d_{2,1}$ may be equal to 0, otherwise $d_{2,1}$ may be equal to 1. If the scheduling DCI triggered a switch of BWP, $d_{2,2}$ may be equal to the switching time, otherwise $d_{2,2}$ may be equal to 0. The switching time may be differently defined depending on a frequency range (FR). For example, the switching time may be defined as 0.5 ms for FR1 and as 0.25 ms for FR2. The switching time may be differently defined depending on a frequency range (FR). For example, the switching time may be defined as 0.5 ms for FR1 and as 0.25 ms for FR2. If a PUSCH of a larger priority index would overlap with PUCCH of a smaller priority index, $d_2$ for the PUSCH of a larger priority may be set as reported by the UE, otherwise $d_2$ may be equal to 0. In the present disclosure T2 may also be referred to as $T_{proc,2}$.

Tables below show processing times according to UE processing capability. Particularly, Table 10 shows a PDSCH processing time for PDSCH processing capability #1 of the UE, Table 11 shows a PDSCH processing time for PDSCH processing capability #2 of the UE, Table 12 shows a PUSCH preparation time for PUSCH timing capability #1 of the UE, and Table 13 shows a PUSCH processing time for PUSCH timing capability #2 of the UE.

TABLE 10

| u/SCS | PDSCH decoding time $N_1$ [symbols] | |
| --- | --- | --- |
| | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 11

| u/SCS | PDSCH decoding time $N_1$ [symbols] |
| --- | --- |
| 0/15 kHz | 3 |
| 1/30 kHz | 4.5 |
| 2/60 kHz | 9 for frequency range 1 |

TABLE 12

| u/SCS | PUSCH preparation time $N_2$ [symbols] |
| --- | --- |
| 0/15 kHz | 10 |
| 1/30 kHz | 12 |
| 2/60 kHz | 23 |
| 3/120 kHz | 36 |

TABLE 13

| u/SCS | PUSCH preparation time $N_2$ [symbols] |
| --- | --- |
| 0/15 kHz | 5 |
| 1/30 kHz | 5.5 |
| 2/60 kHz | 11 for frequency range 1 |

The UE may report a PDSCH processing capability supported thereby to the BS with respect to carriers corresponding to one band entry in a band combination. For example, whether the UE supports only PDSCH processing capability #1 or PDSCH processing capability #2 for each SCS supported in a corresponding band may be reported as a UE capability. The UE may report a PUSCH processing capability supported thereby to the BS with respect to carriers corresponding to one band entry in the band combination. For example, whether the UE supports only PUSCH processing capability #1 or PUSCH processing capability #2 for each SCS supported in a corresponding band may be reported as the UE capability.

If the UE configured to multiplex different UCI types within one PUCCH intends to transmit a plurality of overlapping PUCCHs in a slot or transmit overlapping PUCCH(s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 10 to 12 may be UL channels that satisfy the multiplexing timeline condition(s).

Referring to FIG. 13, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2 and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

In some scenarios, UL or DL scheduling may be performed dynamically or semi-persistently. The BS may configure or indicate to the UE the transmission direction (e.g., DL, UL, or flexible) of each symbol semi-persistently based on a tdd-UL-DL-ConfigurationCommon or tdd-UL-DL-ConfigurationDedicated message or dynamically based on DCI format 2_0. The configured/indicated UL or DL scheduling may be canceled by the configured/indicated transmission direction. For example, a PUCCH configured for transmission of HARQ-ACK of an SPS PDSCH (hereinafter, SPS HARQ-ACK) may be canceled by a configured or indicated transmission direction. When transmission of HARQ-ACK information is canceled by the configured or indicated transmission direction, HARQ-ACK deferral which delays an (SPS) HARQ-ACK PUCCH, transmission of which is cancelled, to be transmitted in another slot is being considered in order to provide the HARQ-ACK information to the BS.

Figure 14:
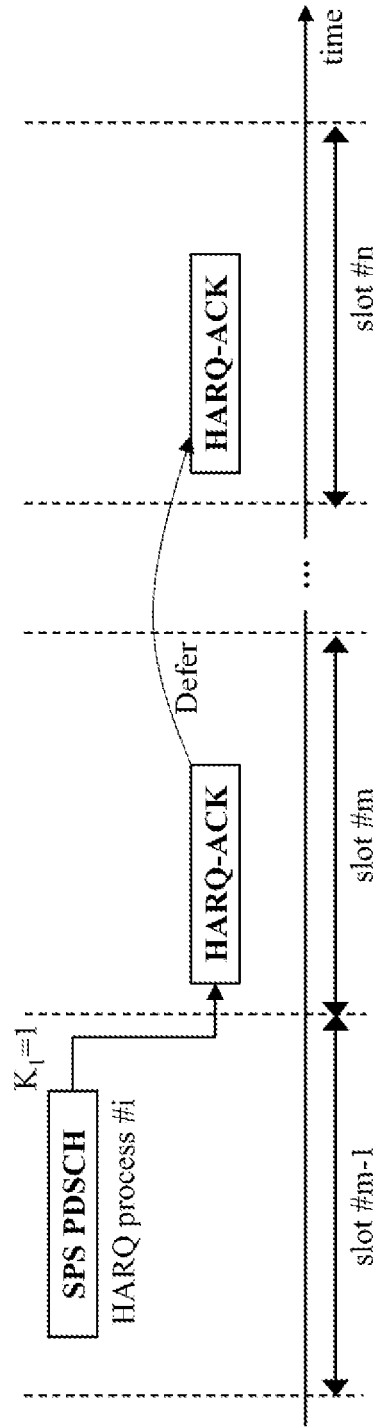
FIG. 14 illustrates an example of HARQ-ACK deferral.

FIG. 14 illustrates an example of HARQ-ACK deferral.

In some scenarios (e.g., 3GPP NR Rel-16), when the UE receives a PDSCH scheduled by the BS, the UE may transmit a PUCCH carrying a HARQ-ACK for the PDSCH (hereinafter, HARQ-ACK PUCCH) at a time designated by scheduling information on the PDSCH. However, these series of operations always cause the UE to transmit the PUCCH after a lapse of a predetermined time from reception of a semi-persistently configured SPS PDSCH. As a result, a TDD UL-DL pattern that is not aligned with the periodicity of the SPS PDSCH may be used, PUCCH transmission may be easily canceled by the dynamic TDD operation of the BS, PDSCH transmission associated with the canceled PUCCH transmission may also be canceled, or retransmission may be requested. Accordingly, to solve these problems, an operation in which the UE defers a PUCCH timing determined for a PDSCH in a predetermined or arbitrary manner, that is, delaying operation is being considered. For example, when a PUCCH configured for transmission of a HARQ-ACK for an SPS PDSCH (hereinafter, SPS HARQ-ACK) is canceled by a configured or indicated transmission direction, HARQ-ACK deferral, which delays the HARQ-ACK transmission after the originally scheduled time, may be considered. Referring to FIG. 14, for example, when an SPS PDSCH in slot #m−1 uses HARQ process #i, and HARQ-ACK transmission for the SPS PDSCH is scheduled in slot #m, the UE may determine to defer a PUCCH in slot #m for the HARQ-ACK transmission for the SPS PDSCH to slot #n based on predetermined conditions. Due to such HARQ-ACK deferral, even if PUCCH transmission is canceled, the UE and BS may transmit/receive HARQ-ACK information for the SPS PDSCH later.

Although HARQ-ACK response transmission by dynamic PDSCH scheduling is not canceled by the configured or indicated transmission direction, PUCCH transmission itself may be canceled by inter-priority prioritization when HARQ-ACK included in the PUCCH is included in a low-priority HARQ-ACK codebook, and PUCCH transmission may not be successfully received by the BS due to a channel change etc. regardless of a scheduling method of the PDSCH.

If HARQ-ACK response transmission is canceled or fails, the BS may fail to determine whether corresponding PDSCH transmission is successful or not, which may cause PDSCH retransmission. This may basically generate an additional delay time in PDSCH transmission. If PUCCH transmission via which a HARQ-ACK codebook including a plurality of HARQ-ACKs is transferred is canceled, numerous PDSCHs corresponding thereto need to be transmitted again, which may cause a big problem in resource availability of a system. This problem may be solved by increasing the size of time-frequency resources used for the PUCCH/PUSCH to improve the reliability of uplink transmission delivering HARQ-ACK. However, UL radio resources of the system to use UL time-frequency resources that are large enough to always obtain satisfactory reliability may be limited.

To solve this problem, the following two methods may be considered. One is a HARQ process-based HARQ-ACK response, which is a Type-3 HARQ-ACK codebook that reports the status of HARQ process(es) that the UE has at a specific time, and the other is codebook retransmission-based one-shot HARQ-ACK retransmission that transmits a previous HARQ-ACK codebook again.

In the present specification, an integrated signaling method for using both the above two methods is described as one (signaling) method when a UE supports the two methods. A UE using some implementations of the present disclosure may receive HARQ-ACK retransmission scheduling through L1 signaling and/or higher layer signaling of a BS to freely perform HARQ process-based retransmission or codebook-based retransmission.

Hereinbelow, some implementations of the present disclosure will be described in regard to a method and procedure in which the UE receives, from the BS, L1 signaling (e.g., DCI) indicating a PUCCH/PUSCH that the UE previously transmitted or a PUCCH/PUSCH, transmission of which has been cancelled, (i.e., that the UE would transmit) and indicating a new PUCCH resource and the UE that has received the L1 signaling retransmits a HARQ-ACK response or UCI that has been included in previous PUCCH/PUSCH transmission or transmits current status information of a subset of HARQ processes that the UE has, on the newly indicated PUCCH resource through the DCI.

Figure 15:
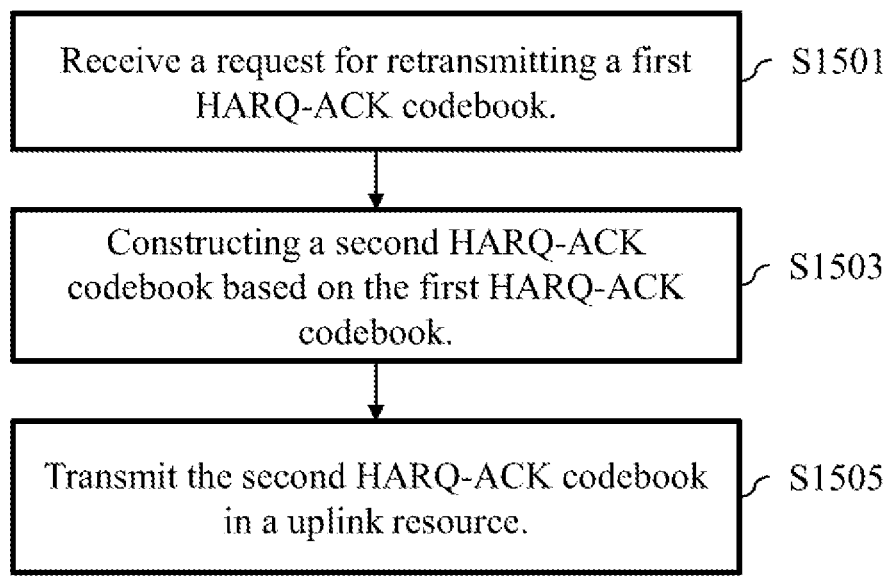
FIG. 15 illustrates an operational flow of a UE according to some implementations of the present disclosure.

FIG. 15 illustrates an operational flow of a UE according to some implementations of the present disclosure.

The UE may receive an RRC configuration (e.g., PDSCH-Config or PUCCH-Config) including a PDSCH reception method and a PUCCH transmission method from the BS. The UE may receive a DL-SCH (e.g., a TB) through an SPS PDSCH or a dynamically scheduled PDSCH and transmit a HARQ-ACK response thereto. The UE may receive, from the BS, L1 signaling (e.g., DCI) indicating that a HARQ-ACK codebook (e.g., a first HARQ-ACK codebook) that the UE previously transmitted or would transmit should be retransmitted according to some implementations of the present disclosure (S1501). Upon receiving the L1 signaling, the UE may reconstruct the HARQ-ACK codebook according to some implementations of the present disclosure based on previous HARQ-ACK response transmission (e.g., transmission of the first HARQ-ACK codebook) indicated by the L1 signaling (S1503) and transmit the reconstructed HARQ-ACK codebook (e.g., a second HARQ-ACK codebook) on a UL resource explicitly or implicitly indicated by the L1 signaling (S1505).

Figure 16:
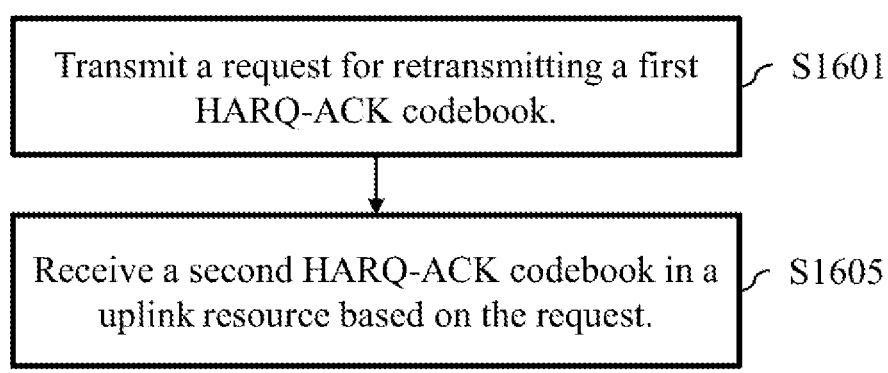
FIG. 16 illustrates an operational flow of a BS according to some implementations of the present disclosure.

FIG. 16 illustrates an operational flow of a BS according to some implementations of the present disclosure.

The BS may perform an RRC configuration including a PDSCH reception method and a PUCCH transmission method for the UE. The BS may transmit a DL-SCH (e.g., a TB) through an SPS PDSCH or a dynamically scheduled PDSCH and receive a HARQ-ACK response thereto. According to some implementations of the present disclosure, the BS may transmit, to the UE, L1 signaling (e.g., DCI) regarding a HARQ-ACK codebook (e.g., a first HARQ-ACK codebook) that requires retransmission by the UE (S1601). The BS may receive the HARQ-ACK codebook while expecting that the UE that has received the L1 signaling will reconstruct the HARQ-ACK codebook according to some implementations of the present disclosure based on previous HARQ-ACK response transmission (e.g., transmission of the first HARQ-ACK codebook) indicated by the L1 signaling and will transmit the reconstructed HARQ-ACK codebook on a UL resource explicitly or implicitly indicated by the L1 signaling. In other words, the BS may receive a second HARQ-ACK codebook associated with the first HARQ-ACK codebook on the UL resource explicitly or implicitly indicated by the L1 signaling (S1605).

The UE and the BS may perform an RRC configuration for determining a slot format through an SPS PDSCH and a TDD operation. The BS may configure one or more SPS PDSCHs for the UE (i.e., may provide one or more SPS configurations to the UE), and the UE may receive an SPS PDSCH and perform PUCCH transmission associated therewith. When PUCCH transmission is canceled by the UE, the UE delays corresponding PUCCH transmission and the BS may indicate new scheduling for a HARQ process associated with PUCCH transmission on a resource after a canceled PUCCH resource. In some implementations, the UE may receive a plurality of schedulings for one HARQ process before a HARQ-ACK response and perform HARQ-ACK PUCCH transmission by multiplexing the schedulings. This serves to operate the SPS PDSCHs of short intervals with a small number of HARQ processes.

The UE and the BS may perform an RRC configuration for PDSCH reception/transmission and PUCCH reception/transmission. The BS may schedule an SPS PDSCH or a PDSCH for the UE, and the UE may receive the (semi-statically or dynamically) scheduled PDSCH and transmit a HARQ-ACK response associated therewith. The BS may transmit, to the UE, L1 signaling (e.g., DCI) requesting retransmission according to some implementations of the present specification with respect to a HARQ-ACK response requiring retransmission or UL transmission including the HARQ-ACK response. Upon receiving the L1 signaling, the UE may reconstruct a HARQ-ACK codebook using the proposed methods according to some implementations of the present disclosure based on previous HARQ-ACK response transmission indicated by the L1 signaling and transmit the reconstructed HARQ-ACK codebook on a UL resource explicitly or implicitly indicated by the L1 signaling. The BS may receive the HARQ-ACK response retransmitted by the UE and, if necessary, update the status of HARQ process(es) according to the corresponding HARQ-ACK response.

Some methods of implementations of the present disclosure described below may be selectively applied. Alternatively, each method may be independently applied without being combined with other methods. Alternatively, one or more methods may be applied in a combination or associated form. Some terms, symbols, orders, etc. used in the present disclosure may be replaced with other terms, symbols, orders, etc.

<Implementation 1> Scheme Selection for HARQ-ACK Retransmission

When two or more HARQ-ACK retransmission methods are configured for the UE, the UE may dynamically select one retransmission method through an indicator included in a DCI format that schedules a PDSCH or a PUSCH. The HARQ-ACK retransmission methods may include the following HARQ-ACK retransmission methods.

(HARQ Process-Based) (Rel-16) Type-3 Codebook
    For example, the Type-3 HARQ-ACK codebook defined in Section 9.1.4 of version 16 of 3GPP TS 38.213 may be used for HARQ-ACK transmission.
    The UE indicated to retransmit HARQ-ACK through the (Rel-16) Type-3 codebook may report status information of all HARQ processes configured for the UE (e.g., respective HARQ-ACKs of all HARQ processes) through one Type-3 codebook.
    In some implementations of the present disclosure, the (Rel-16) Type-3 codebook may also include new data indicator (NDI) information for each HARQ process, and HARQ-ACK of each HARQ process may include a set of HARQ-ACK(s) for each codebook block group. An NDI may be used to determine whether a transmitted/received TB for a given HARQ process is new transmission or retransmission. If the NDI has been toggled in PDSCH scheduling DCI compared to a previous NDI value, i.e., if an NDI value in the PDSCH scheduling DCI is different from an NDI value sent in previous transmission, this may mean that a corresponding TB scheduled by the PDSCH scheduling DCI is new DL data.

(HARQ process-based) enhanced Type-3 codebook
    A Type-3 codebook that selectively transmits only partial information of the (Rel-16) Type-3 codebook may be used for HARQ-ACK transmission. In the present disclosure, for convenience of description, a HARQ process-based codebook used to report HARQ-ACK information for all HARQ processes configured for the UE is referred to as the (Rel-16) Type-3 codebook or a legacy Type-3 codebook, and a HARQ process-based codebook used to report HARQ-ACK information for some of the HARQ processes configured for the UE is referred to as the enhanced Type-3 codebook.
    As an example, the enhanced Type-3 codebook may be a Type-3 HARQ-ACK codebook configured for an indicated and/or configured subset of HARQ processes. For example, if the UE supports a maximum of A serving cells and a maximum of B HARQ processes on DL in each serving cell, the BS may respectively indicate, to the UE, whether B HARQ processes are subjected to the enhanced Type-3 codebook with respect to each of the A serving cells. For example, three serving cells of cell #0, cell #1, and cell #2 may be configured for the UE, and a Rel-16 Type-3 codebook, enhanced Type-3 HARQ-ACK codebook 0 in which HARQ processes #2, #4, and #5 of cell #0 and HARQ processes #2 and #3 of cell #2 are configured, and enhanced Type-3 HARQ-ACK codebook 1 in which HARQ processes #0 and #2 of cell #1 are configured may be configured for the UE by the BS. Upon receiving DCI including indication for enhanced Type-3 HARQ-ACK codebook 1, the UE may transmit a HARQ-ACK codebook including HARQ-ACK information for each of HARQ processes #0 and #2 of cell #1.

As another example, the enhanced Type-3 codebook may be a Type-3 HARQ-ACK codebook configured for an indicated and/or configured subset of component carriers (CCs). For example, if the UE supports a maximum of A serving cells, the BS may provide the UE with information indicating whether corresponding HARQ processes of the A serving cells are subjected to a corresponding enhanced Type-3 codebook. For example, three serving cells of cell #0, cell #1, and cell #2 may be configured for the UE, HARQ processes #0 to #5 for cell #0, HARQ processes #0 to #5 for cell #1, and HARQ processes #0 to #3 for cell #2 may be configured, and a Rel-16 Type-3 codebook, enhanced Type-3 HARQ-ACK codebook 0 in which cell #0 and cell #2 are configured, and enhanced Type-3 HARQ-ACK codebook 1 in which cell #1 is configured may be configured for the UE by the BS. Upon receiving DCI including indication for enhanced Type-3 HARQ-ACK codebook 1, the UE may transmit a HARQ-ACK codebook including HARQ-ACK information for each of HARQ processes #0 to #5 of cell #1.

As another example, the enhanced Type-3 codebook may be a Type-3 HARQ-ACK codebook configured for a subset of HARQ processes used for SPS PDSCH(s).

As another example, the enhanced Type-3 codebook may be a Type-3 HARQ-ACK codebook configured for a subset of HARQ processes that may be used for UL transmission with a high priority index.

The UE indicated to retransmit HARQ-ACK through the enhanced Type-3 codebook may report status information of some HARQ processes selected through a method indicated to or configured for the UE through one Type-3 codebook.

In some implementations of the present specification, the enhanced Type-3 codebook may also include NDI information for each HARQ process, and HARQ-ACK of each HARQ process may include a set of HARQ-ACK(s) for each codebook block group.

Methods of selecting a plurality of enhanced Type-3 codebooks, i.e., a plurality of HARQ processes, may be configured for the UE. The UE for which a plurality of HARQ process selection methods is configured may use one HARQ process selection method indicated together through L1 signaling (e.g., DCI) or higher layer signaling provided by the BS when the enhanced Type-3 codebook is indicated. The plurality of enhanced Type-3 codebooks may be different subsets of HARQ-ACK processes for which the UE will report HARQ-ACK information.

(Codebook-based) one-shot HARQ-ACK retransmission

The UE may receive DCI X that explicitly or implicitly indicates a previously scheduled PUCCH or PDSCH for the UE from the BS and retransmit the PUCCH indicated by the DCI X, a HARQ-ACK codebook included in the PUCCH, or a HARQ-ACK response corresponding to the PDSCH. Hereinafter, for convenience of description, a PUCCH that the UE transmitted or would transmit before the UE receives DCI X and that is indicated by the DCI or a PUCCH scheduled in a slot indicated by the DCI is referred to as a previous PUCCH, and a PUCCH transmitted based on DCI X and the previous PUCCH is referred to as a new PUCCH.

A UCI payload during retransmission may be a UCI payload generated based on a slot in which HARQ-ACK transmission for which retransmission is requested is previously scheduled.

When the UE is indicated to perform one-shot HARQ-ACK retransmission, the UE may additionally receive an indicator through which HARQ-ACK transmission for which retransmission is requested explicitly indicates a previously scheduled PUCCH or PDSCH. This indicator may indicate the previously scheduled PUCCH or PDSCH based on a newly scheduled PUCCH in units of slot offsets, together with one-shot HARQ-ACK retransmission indication. For example, a difference between a slot index of a slot which is scheduled by DCI X or includes a new PUCCH to be transmitted based on DCI X and a slot index of a previous slot that DCI X intends to indicate may be indicated to the UE. Alternatively, the indicator may indicate the previously scheduled PUCCH or PDSCH in units of slot offsets based on a reception time of one-shot HARQ-ACK retransmission indication. For example, a difference between a slot index of a slot in which a PDCCH through which DCI X is received is located and a slot index of a slot that DCI X intends to indicate may be indicated to the UE. The UE that transmitted or would transmit a PUCCH or PUSCH having a first HARQ-ACK codebook in slot m may be indicated to transmit the PUCCH having the first HARQ-ACK in slot n+K which is located after slot m by DCI X received in a PDCCH ending in slot n. DCI X may include information about slot offset L and the UE may determine slot m as m=n−L.

In order to enable the UE to dynamically select one of the retransmission methods, at least one of the following methods may be considered.

Method 1_1: In order for the UE to obtain the following two pieces of information in DCI, one or more DCI fields may be added to a DCI format, or one or more existing DCI fields may be reinterpreted as follows.

1-bit HARQ-ACK retransmission trigger

The UE does not perform HARQ-ACK retransmission when the HARQ-ACK retransmission trigger is indicated as '0' and performs HARQ-ACK retransmission only when the HARQ-ACK retransmission trigger is indicated as '1'.

N-bit HARQ-ACK retransmission scheme indicator

When the HARQ-ACK retransmission trigger is indicated as '1' so that the UE performs HARQ-ACK retransmission, one of retransmission methods may be indicated to the UE through the N-bit retransmission scheme indicator. In this case, the size N of the retransmission scheme indicator field is $ceil(log_2(K))$, where K is the number of configured retransmission methods. Each of a plurality of configured enhanced Type-3 codebooks may be regarded as one retransmission method. As an example, when the UE is configured to perform a (Rel-16) Type-3 codebook, three enhanced Type-3 codebooks, and one-shot HARQ-ACK retransmission, the number K of retransmission methods is 5 and the size N of the retransmission scheme indicator may be 3.

When using Method 1_1, a previously scheduled PUCCH or PDSCH associated with HARQ-ACK to be retransmitted through one-shot HARQ-ACK retransmission may be determined through a value configured by higher layer signaling of the B S. As an example, a slot distance (e.g., the number of slots) from a PUCCH that triggering DCI schedules to a PUCCH to be retransmitted may be preconfigured through an RRC parameter, and the UE may retransmit, through a scheduled PUCCH, HARQ-ACK information included in a PUCCH before the preconfigured slot distance from PUCCH transmission scheduled by the triggering DCI of one-shot HARQ-ACK retransmission.

Method 1_2: In order for the UE to obtain the following two pieces of information in DCI, one or more DCI fields may be added to a DCI format, or one or more existing DCI fields may be reinterpreted as follows.

N-bit HARQ-ACK retransmission scheme indicator
One of retransmission methods may be indicated to the UE through an N-bit retransmission scheme indicator. In this case, the size N of the retransmission scheme indicator is $ceil(log_2(K+1))$, where K is the number of configured retransmission methods. Each of a plurality of configured enhanced Type-3 codebooks may be regarded as one retransmission method. As an example, when the UE is configured to perform a (Rel-16) Type-3 codebook, three enhanced Type-3 codebooks, and one-shot HARQ-ACK retransmission, the number K of retransmission methods is 3 and the size N of the retransmission scheme indicator may be 2.
One of bit representations of the HARQ-ACK retransmission scheme indicator (e.g., all '0's or all '1's) may be reserved as "no trigger state". The UE may not perform HARQ-ACK retransmission when "no trigger state" is indicated.

M-bit additional information field for HARQ-ACK retransmission
The UE may receive a HARQ-ACK retransmission scheme indicated by the N-bit HARQ-ACK retransmission scheme indicator and perform HARQ-ACK retransmission based on an M-bit additional information field. The M-bit additional information field may be differently interpreted according to the indicated HARQ-ACK retransmission scheme.
For example, when a (Rel-16) Type-3 codebook is indicated by the N-bit HARQ-ACK retransmission scheme indicator, the UE may ignore the additional information field without using the field.
As another example, when an enhanced Type-3 codebook is indicated by the N-bit HARQ-ACK retransmission scheme indicator, the additional information field may be used to indicate one of one or more enhanced Type-3 codebooks configured for the UE.
As another example, when one-shot HARQ-ACK retransmission is indicated by the N-bit HARQ-ACK retransmission scheme indicator, the additional information field may be used to indicate the location of a previously scheduled PUCCH or PDSCH. As an example, the additional information field may be used to indicate a (sub-)slot distance from a PUCCH scheduled by triggering DCI to a PUCCH to be retransmitted or a (sub-)slot distance from the last symbol of a PDCCH through which the triggering DCI is received to a PUCCH to be retransmitted. Alternatively, a list of these slot distances may be preconfigured by the BS and one of the configured slot distances may be indicated to the UE. This operation may allow the UE to retransmit a wide range of PUCCH with limited information and allow the UE not to unnecessarily perform retransmission of short intervals.

The length of the additional information field, i.e., M bits, may be determined through $ceil(log_2(max(Q, R)))$, where Q is the number of enhanced Type-3 codebooks configured for the UE and R is a retransmission range of one-shot HARQ-ACK retransmission (e.g., a maximum slot length, the number of slots, or a set of slots with which retransmission may be requested/indicated by retransmission indication). For example, if a slot offset for a certain reference point is provided to the UE together with retransmission indication to indicate a target of HARQ-ACK retransmission, the slot offset may be less than or equal to R, which is the retransmission range.

The retransmission range of one-shot HARQ-ACK retransmission may be configured through higher layer signaling of the BS or may be a predefined value (e.g., 16 slots). Alternatively, the largest value among PDSCH-to-HARQ-ACK timing values configured for the UE may be assumed as the retransmission range.

As another example, if one-shot HARQ-ACK retransmission is performed through a set of slot offsets, configured by higher layer signaling of the BS (i.e., if a PUCCH separated by a slot offset associated with an indicated index from a scheduled PUCCH is retransmitted by indicating an index of a slot offset in the set of slot offsets), the retransmission range of one-shot HARQ-ACK retransmission may represent the number of configured slot offsets, i.e., a set of slot offsets. In other words, slots in which retransmission may be indicated to be performed by retransmission indication may be limited to slots that may be indicated by the set of the configured slot offsets.

In some implementations, if $M'(=ceil(log_2(Q)))$ is less than M, then M' least significant bit(s) (LSB(s)) or M' most significant bit(s) (MSB(s)) among the M bits may be used to indicate one of a plurality of enhanced Type-3 codebooks.

Alternatively, the length of the additional information field, i.e., M bits, may be determined through $M=ceil(log_2(Q))$, where Q is the number of enhanced Type-3 codebooks configured for the UE. In this case, the retransmission range of one-shot HARQ-ACK retransmission may be $2^M$ slots.

Method 1_3: In order for the UE to obtain the following two pieces of information in DCI, one or more DCI fields may be added to a DCI format, or one or more existing DCI fields may be reinterpreted as follows.

1-bit HARQ-ACK retransmission scheme indicator

The UE may receive one of a Type-3 codebook and one-shot HARQ-ACK retransmission indicated through a 1-bit HARQ-ACK retransmission scheme indicator. The Type-3 codebook may include a (Rel-16) Type-3 codebook and a plurality of configured enhanced Type-3 codebook(s).

M-bit additional information field for HARQ-ACK retransmission

The UE may receive a HARQ-ACK retransmission scheme indicated by the 1-bit HARQ-ACK retransmission scheme indicator and perform HARQ-ACK retransmission based on an M-bit additional information field. The M-bit additional information field may be differently interpreted according to the indicated HARQ-ACK retransmission scheme.

For example, when an enhanced Type-3 codebook is indicated by the 1-bit HARQ-ACK retransmission scheme indicator, the additional information field may be used to indicate one of one or more enhanced Type-3 codebook(s) that may include a (Rel-16) Type-3 codebook configured for the UE.

As another example, when one-shot HARQ-ACK retransmission is indicated by the 1-bit HARQ-ACK retransmission scheme indicator, the additional information field may be used to indicate the location of a previously scheduled PUCCH or PDSCH. As an example, the additional information field may be used to indicate a (sub-)slot distance from a PUCCH scheduled by triggering DCI to a PUCCH to be retransmitted or a (sub-)slot distance from the last symbol of a PDCCH through which the triggering DCI is received to a PUCCH to be retransmitted. Alternatively, a list of these slot distances may be preconfigured by the BS and one of configured slot distances may be indicated to the UE. This operation may allow the UE to retransmit a wide range of PUCCH with limited information and allow the UE not to unnecessarily perform retransmission of short intervals.

The length of the additional information field, i.e., M bits, may be determined through $\text{ceil}(\log_2(\max(Q, R)))$, where Q is the number of enhanced Type-3 codebooks configured for the UE and R is a retransmission range of one-shot HARQ-ACK retransmission (e.g., a maximum slot length, the number of slots, or a set of slots with which retransmission may be requested/indicated by retransmission indication).

The retransmission range of one-shot HARQ-ACK retransmission may be configured through higher layer signaling of the BS or may be a predefined value (e.g., 16 slots). Alternatively, the largest value among PDSCH-to-HARQ-ACK timing values configured for the UE may be assumed as the retransmission range.

As another example, if one-shot HARQ-ACK retransmission is performed through a set of slot offsets, configured by higher layer signaling of the BS (i.e., if a PUCCH separated by a slot offset associated with an indicated index from a scheduled PUCCH is retransmitted by indicating an index of a slot offset in the set), the retransmission range of one-shot HARQ-ACK retransmission may represent the number of configured slot offsets, i.e., a set of slot offsets. In other words, slots in which retransmission may be indicated to be performed by retransmission indication may be limited to slots that may be indicated by the set of the configured slot offsets.

In some implementations, if $M'(=\text{ceil}(\log_2(Q)))$ is less than M, then M' LSB(s) or M' MSB(s) among the M bits may be used to indicate one of a plurality of enhanced Type-3 codebooks.

The number of configured Type-3 codebooks is the total number of a configured (Rel-16) Type-3 codebook (i.e., codebook including HARQ-ACK information for all HARQ-ACK processes configured for the UE) and a plurality of configured enhanced Type-3 codebook(s).

To indicate one of configured Type-3 codebooks using the M bits, the following methods may be considered. A bit representation indicating the (Rel-16) Type-3 codebook may be predefined. For example, when an index of an enhanced Type-3 codebook starts with 0, a bit representation of the M bits being all '1's may indicate the Rel-16 Type-3 codebook and, when an index of the enhanced Type-3 codebook starts with 1, a bit representation of the M bits being all '0's may indicate the Rel-16 Type-3 codebook. Other bit representations may indicate enhanced Type-3 codebooks having an index of the same value.

As another example, the length of the additional information field, i.e., M bits, may be determined through $M=\text{ceil}(\log_2(Q))$, where Q is the number of enhanced Type-3 codebooks configured for the UE. In this case, a retransmission range of one-shot HARQ-ACK retransmission may be $2^M$ slots.

To represent the case in which HARQ-ACK retransmission is not performed, at least one of the following methods may be additionally considered. When one-shot HARQ-ACK retransmission is indicated by the HARQ-ACK retransmission scheme indicator and a slot offset is indicated as 0 by the additional information field, the UE may not perform HARQ-ACK retransmission. When a Type-3 codebook is indicated by the HARQ-ACK retransmission scheme indicator and a Type-3 codebook associated with a value indicated by the additional information field does not exist, the UE may not perform HARQ-ACK retransmission.

In some implementations, Method 1_3 may be limited to the case in which a DL-SCH is not scheduled. To this end, the BS may indicate whether the DL-SCH is scheduled through an FDRA field of DCI. For example, in order to indicate that the DL-SCH is not scheduled, the BS may set bits of the FDRA field in the DCI to all '0's for FDRA Type 0 or dynamicSwitch (i.e., for RRC parameter resourceAllocation=resourceAllocationType0 or dynamicSwitch provided to the UE) and to all '1's for FDRA Type 1 (i.e., for RRC parameter resourceAllocation=resourceAllocationType1 provided to the UE).

Method 1_4: In order for the UE to obtain the following three pieces of information in the DCI, one or more DCI fields may be added to a DCI format, or one or more existing DCI fields may be reinterpreted as follows. In the present disclosure, the case in which one specific bit of '0' indicates operation A and one specific bit of '1' indicates operation B may be replaced with the case in which one specific bit of '0' indicates operation B and one specific bit of '1' indicates operation A.

1-bit HARQ-ACK retransmission trigger

The UE may not perform HARQ-ACK retransmission when the HARQ-ACK retransmission trigger is indicated as '0' and perform HARQ-ACK retransmission only when the HARQ-ACK retransmission trigger is indicated as '1'.

N-bit HARQ-ACK retransmission scheme indicator

When the HARQ-ACK retransmission trigger is indicated as '1' to perform HARQ-ACK retransmission, one of retransmission methods may be indicated to the UE through the N-bit retransmission scheme indicator. In this case, the size N of the retransmission scheme indicator is ceil($\log_2$(K+1)), where K is the number of configured retransmission methods. Each of a plurality of enhanced Type-3 codebooks may be regarded as one retransmission method. As an example, when the UE is configured to perform 4 enhanced Type-3 codebooks including a (Rel-16) Type-3 codebook and one-shot HARQ-ACK retransmission, the number K of retransmission methods is 5 and the size of N of the retransmission scheme indicator may be 3.

As another method, the N bits may be configured as 1 bit to indicate whether the corresponding bit is an enhanced Type-3 codebook (including the (Rel-16) Type-3 codebook) or one-shot HARQ-ACK retransmission. For convenience, this method is referred to as a "1-bit HARQ-ACK retransmission scheme trigger" method.

M-bit additional information field for HARQ-ACK retransmission

The UE may receive a HARQ-ACK retransmission scheme indicated by the N-bit HARQ-ACK retransmission scheme indicator and perform HARQ-ACK retransmission based on the M-bit additional information field. The M-bit additional information field may be differently interpreted according to the indicated HARQ-ACK retransmission scheme.

For example, when an enhanced Type-3 codebook is indicated by the N-bit HARQ-ACK retransmission scheme indicator, the additional information field may be used to indicate one of one or more enhanced Type-3 codebooks that may include the (Rel-16) Type-3 codebook configured for the UE. When a 1-bit HARQ-ACK retransmission scheme trigger method in which the N bits are configured as 1 bit is applied, the M bits may indicate which one of a plurality of enhanced Type-3 codebooks (including the (Rel-16) Type-3 codebooks) is triggered.

As another example, when one-shot HARQ-ACK retransmission is indicated by the N-bit HARQ-ACK retransmission scheme indicator, the additional information field may be used to indicate the location of a previously scheduled PUCCH (e.g., a PUCCH of a previous time, which is a target of HARQ-ACK retransmission, or a corresponding UL (sub-)slot) or PDSCH. As an example, the additional information field may be used to indicate a (sub-)slot distance from a PUCCH scheduled by triggering DCI to a PUCCH to be retransmitted or a (sub-) slot distance from the last symbol of a PDCCH through which the triggering DCI is received to a PUCCH to be retransmitted. Alternatively, a list of these slot distances may be preconfigured by the BS and one of configured slot distances may be indicated to the UE. This operation may allow the UE to retransmit a wide range of PUCCH with limited information and allow the UE not to unnecessarily perform retransmission of short intervals.

The length of the additional information field, i.e., M bits, may be determined through ceil($\log_2$(max(Q, R))), where Q is the number of enhanced Type-3 codebooks configured for the UE and R is a retransmission range of one-shot HARQ-ACK retransmission (e.g., a maximum slot length, the number of slots, or a set of slots with which retransmission may be requested/indicated by retransmission indication).

The retransmission range of one-shot HARQ-ACK retransmission may be configured through higher layer signaling of the BS or may be a predefined value (e.g., 16 slots). Alternatively, the largest value among PDSCH-to-HARQ-ACK timing values configured for the UE may be assumed as the retransmission range.

As another example, if one-shot HARQ-ACK retransmission is performed through a set of slot offsets, configured by higher layer signaling of the BS (i.e., if a PUCCH separated by a slot offset associated with an indicated index from a scheduled PUCCH is retransmitted by indicating an index of a slot offset in the set), the retransmission range of one-shot HARQ-ACK retransmission may represent the number of configured slot offsets, i.e., a set of slot offsets. In other words, slots in which retransmission may be indicated to be performed by retransmission indication may be limited to slots that may be indicated by the set of the configured slot offsets.

In some implementations, if M'(=ceil($\log_2$(Q))) is less than M, then M' LSB(s) or M' MSB(s) among the M bits may be used to indicate one of a plurality of enhanced Type-3 codebooks.

The number Q of configured Type-3 codebooks may be the total number of a configured (Rel-16) Type-3 codebook and a plurality of configured enhanced Type-3 codebooks.

To indicate one of configured Type-3 codebooks using the M bits, the following methods may be considered. A bit representation indicating the Rel-16 Type-3 codebook may be predefined. For example, when an index of an enhanced Type-3 codebook starts with 0, a bit representation of the M bits being all '1's may indicate the Rel-16 Type-3 codebook and, when an index of the enhanced Type-3 codebook starts with 1, a bit representation of the M bits being all '0's may indicate the Rel-16 Type-3 codebook. Other bit representations may indicate enhanced Type-3 codebooks having an index of the same value.

As another example, the length of the additional information field, i.e., M bits, may be determined through M=ceil($\log_2(Q)$), where Q is the number of enhanced Type-3 codebooks configured for the UE. In this case, a retransmission range of one-shot HARQ-ACK retransmission may be $2^M$ slots.

Method 1_5: In order for the UE to obtain the following two pieces of information in the DCI, one or more DCI fields may be added to the DCI format, or one or more existing DCI fields may be reinterpreted as follows. In the present disclosure, "the UE uses a specific codebook" may mean that the UE operates while considering that transmission of the specific codebook has been indicated (or triggered) through the DCI.

1-bit HARQ-ACK retransmission scheme indicator

The UE may not perform HARQ-ACK retransmission when the HARQ-ACK retransmission trigger is indicated as '0' and may perform HARQ-ACK retransmission only when the HARQ-ACK retransmission trigger is indicated as '1'.

When the information is indicated as '1', the UE may determine the HARQ-ACK retransmission method based on whether a DL-SCH indicated through the FDRA field of the DCI is scheduled/transmitted. For example, in order to indicate that the DL-SCH is not scheduled, the BS may set bits of the FDRA field in the DCI to all '0's for FDRA Type 0 or dynamicSwitch (i.e., for RRC parameter resourceAllocation=resourceAllocationType0 or dynamicSwitch provided to the UE) and to all '1's for FDRA Type 1 (i.e., for RRC parameter resourceAllocation=resourceAllocationType1 provided to the UE).

For example, the UE may use one-shot HARQ-ACK retransmission when the BS does not schedule the DL-SCH (i.e., the UE considers that a one-shot HARQ-ACK retransmission operation has been triggered) and use the Type-3 codebook when the DL-SCH is scheduled (i.e., the UE may consider that Type-3 codebook transmission has been triggered). This operation may be limited to the case in which only one Type-3 codebook (e.g., a legacy Type-3 codebook or an enhanced Type-3 codebook) is configured. Alternatively, a Type-3 codebook to be used in this case may be configured or predefined. As an example, when the DL-SCH is scheduled, the UE may always use the legacy Type-3 codebook or use the first codebook (e.g., set to the lowest index) among the configured Type-3 codebooks.

As another example, when the BS does not schedule the DL-SCH, the UE may use the Type-3 codebook and, when the BS schedules the DL-SCH, the UE may use one-shot HARQ-ACK retransmission. This operation may be limited to the case in which a slot offset used for one-shot HARQ-ACK retransmission is set to one value.

As another example, the following methods may be additionally considered only when one type of HARQ-ACK retransmission method is configured.

Detailed method 1_5-1: In the case in which only a legacy or enhanced Type-3 codebook, which is a HARQ process-based retransmission method, is configured, when the BS does not schedule the DL-SCH, the UE may selectively use one Type-3 codebook method based on Method 1_5 and, when the BS schedules the DL-SCH, the UE may use a specific Type-3 codebook which is configured for scheduling of the DL-SCH or is separately preconfigured. For example, when the DL-SCH is not scheduled, the UE may selectively use one Type-3 codebook and, when the DL-SCH is scheduled, the UE may use the legacy Type-3 codebook or the first codebook of the configured Type-3 codebooks.

Detailed method 1_5-2: In the case in which only one-shot HARQ-ACK retransmission, which is a codebook-based retransmission method, is configured, when the BS does not schedule the DL-SCH, the UE may acquire one slot offset using Method 1_5 to retransmit HARQ-ACK and, when the BS schedules the DL-SCH, the UE may use the configured first or n-th value or a predetermined slot offset value.

M-bit additional information field for HARQ-ACK retransmission

The UE may receive the HARQ-ACK retransmission scheme indicated by the 1-bit HARQ-ACK retransmission scheme indicator and perform HARQ-ACK retransmission based on the M-bit additional information field. The M-bit additional information field may be differently interpreted according to the indicated HARQ-ACK retransmission scheme.

For example, when the enhanced Type-3 codebook is indicated by the 1-bit HARQ-ACK retransmission scheme indicator, the additional information field may be used to indicate one of one or more enhanced Type-3 codebooks that may include a (Rel-16) Type-3 codebook configured for the UE.

As another example, when one-shot HARQ-ACK retransmission is indicated by the 1-bit HARQ-ACK retransmission scheme indicator, the additional information field may be used to indicate the location of a previously scheduled PUCCH or PDSCH. As an example, the additional information field may be used to indicate a (sub-)slot distance from a PUCCH scheduled by triggering DCI to a PUCCH to be retransmitted or a (sub-)slot distance from the last symbol of a PDCCH through which the triggering DCI is received to a PUCCH to be retransmitted. Alternatively, a list of these slot distances may be preconfigured by the BS and one of configured slot distances may be indicated to the UE. This operation may allow the UE to retransmit a wide range of PUCCH with limited information and allow the UE not to unnecessarily perform retransmission of short intervals.

The length of the additional information field, i.e., M bits, may be determined through ceil($\log_2$(max(Q, R))), where Q is the number of enhanced Type-3 codebooks configured for the UE and R is a retransmission range of one-shot HARQ-ACK retransmission (e.g., a maximum slot length, the number of slots, or a set of slots with which retransmission may be requested/indicated by retransmission indication).

The retransmission range of one-shot HARQ-ACK retransmission may be configured through higher layer signaling of the BS or may be a predefined value (e.g., 16 slots). Alternatively, the largest value among PDSCH-to-HARQ-ACK timing values configured for the UE may be assumed as the retransmission range.

As another example, if one-shot HARQ-ACK retransmission is performed through a set of slot offsets, configured by higher layer signaling of the BS (i.e., when a PUCCH separated by a slot offset associated with an indicated index from a scheduled PUCCH is retransmitted by indicating an index of a slot offset in the set), the retransmission range of one-shot HARQ-ACK retransmission may represent the number of configured slot offsets, i.e., a set of slot offsets. In other words, slots in which retransmission may be indicated to be performed by retransmission indication may be limited to slots that may be indicated by the set of the configured slot offsets.

In some implementations, if M'(=ceil($\log_2(Q)$)) is less than M, then M' LSB(s) or M' MSB(s) among the M bits may be used to indicate one of a plurality of enhanced Type-3 codebooks. The number Q of configured Type-3 codebooks may be the total number of a configured (Rel-16) Type-3 codebook and a plurality of configured enhanced Type-3 codebooks.

To indicate one of configured Type-3 codebooks using the M bits, the following methods may be considered. A bit representation indicating the (Rel-16) Type-3 codebook may be predefined. For example, when an index of an enhanced Type-3 codebook starts with 0, a bit representation of the M bits being all '1's may indicate the Rel-16 Type-3 codebook and, when an index of the enhanced Type-3 codebook starts with 1, a bit representation of the M bits being all '0's may indicate the Rel-16 Type-3 codebook. Other bit representations may indicate enhanced Type-3 codebooks having an index of the same value.

As another example, the length of the additional information field, i.e., M bits, may be determined through M=ceil($\log_2(Q)$), where Q is the number of enhanced Type-3 codebooks configured for the UE. In this case, a retransmission range of one-shot HARQ-ACK retransmission may be $2^M$ slots.

To represent the case in which HARQ-ACK retransmission is not performed, at least one of the following methods may be additionally considered. When one-shot HARQ-ACK retransmission is indicated by the HARQ-ACK retransmission scheme indicator and a slot offset is indicated as 0 by the additional information field, the UE may not perform HARQ-ACK retransmission. When a Type-3 codebook is indicated by the HARQ-ACK retransmission scheme indicator and a Type-3 codebook associated with a value indicated by the additional information field does not exist, the UE may not perform HARQ-ACK retransmission.

To use Methods 1_1/1_2/1_3/1_4/1_5, existing fields, such as a TDRA field, a modulation and coding scheme (MCS) field, and/or a redundancy version (RV) field, may be reused. In order to reuse the existing fields, the BS may indicate, through the FDRA field, that DCI does not schedule user data of a DL-SCH. For example, in order to indicate that the DL-SCH is not scheduled, the BS may set bits of the FDRA field in the DCI to all '0's for Type 0 or dynamicSwitch (i.e., for RRC parameter resourceAllocation=resourceAllocationType0 or dynamicSwitch provided to the UE) and to all '1's for FDRA Type 1 (i.e., for RRC parameter resourceAllocation=resourceAllocationType1 provided to the UE). If the size of a required field is smaller than the size of the reused field, only MSB(s) or LSB(s) of the reused field may be used as the corresponding field.

As described in Method 1_3, some methods may be limitedly used only when the DL-SCH is not scheduled. These methods may correspond to the case in which the existing fields, such as the TDRA, MCS, and/or RV field(s), are reused to use Methods 1_1/1_2/1_3/1_4/1_5. To this end, the BS may indicate whether the DL-SCH is scheduled through the FDRA field of the DCI. For example, in order to indicate that the DL-SCH is not scheduled, the BS may set bits of the FDRA field in the DCI to all '0's in the case of FDRA type 0 or dynamicSwitch and to all '1's in the case of FDRA type 1.

In some implementations of the present disclosure, the above-described HARQ-ACK retransmission methods may be used differently from each other according to a configured HARQ-ACK retransmission method. That is, different methods may be used for the respective cases in which the UE is configured to use only the legacy or enhanced Type-3 codebook, which is a HARQ process-based retransmission method, the UE is configured to use only one-shot HARQ-ACK retransmission, which is a codebook-based retransmission method, and the UE is configured to use both methods. For example, when the UE is configured to use only the legacy or enhanced Type-3 codebook, which is the HARQ process-based HARQ-ACK retransmission method, or when the UE is configured to use only one-shot HARQ-ACK retransmission, which is the codebook-based retransmission method, Method 1_5 may be used and, when the UE is configured to use the both methods, Method 1_4 may be used.

In some implementations of the present disclosure, the HARQ-ACK retransmission method may be configured based on a priority. For example, the HARQ-ACK retransmission method configured to be used by the UE may be different according to the priority of a scheduled PUCCH. When the length of a DCI field determined by each priority, for example, the length of the HARQ-ACK retransmission scheme indicator field of Method 1_1 or the length of the HARQ-ACK retransmission scheme indicator and the additional information field of Method 1_2, differs according to the priority, the UE may configure or assume a DCI format for each field based on the largest value among values determined according to configured priorities.

<Implementation 2> NDI and CBG Configuration for Enhanced Type-3 Codebook

In some implementations, for the (Rel-16) Type-3 codebook, the BS may configure, for the UE, whether NDI information is included in each HARQ process of the Type-3 codebook and whether HARQ-ACK of a CBG unit is reported. As mentioned earlier, the NDI is used to determine whether a TB transmitted/received for a given HARQ process is new transmission or retransmission. For example, if the NDI has been toggled in PDSCH scheduling DCI compared to a previous NDI value, i.e., if an NDI value in the PDSCH scheduling DCI is different from an NDI value sent in previous transmission, this may mean that a TB scheduled by the PDSCH scheduling DCI for a given HARQ process is new DL data.

In some implementations of the present disclosure, when the UE uses the enhanced Type-3 codebook, the UE may use a plurality of Type-3 codebooks with different purposes. As an example, the UE may be configured with a Type-3 codebook for the purpose of increasing reliability by reducing a UCI payload size or a Type-3 codebook for the purpose of acquiring in detail only information about specific HARQ process(es). To meet this purpose, it may be considered to separately configure, with respect to the enhanced Type-3 codebook, whether the NDI information is included and whether HARQ-ACK is reported in units of CBG. For example, the following methods may be considered.

Method 2_1: Whether the NDI information is included and whether HARQ-ACK is reported in units of CBG may be configured for each of a (Rel-16) Type-3 codebook and all enhanced Type-3 codebooks. For example, a pair of an RRC parameter for determining whether the NDI information is included and an RRC parameter for determining whether HARQ-ACK is reported in units of CBG may be separately configured in addition to an RRC parameter for determining whether the NDI information is included and an RRC parameter for determining whether HARQ-ACK is reported in units of CBG with respect to the (Rel-16) Type-3 codebook. The pair of RRC parameters may determine whether the NDI information is included and whether HARQ-ACK is reported in units of CBG, with respect to all enhanced Type-3 codebooks. For example, an NDI feedback-related RRC parameter and a CBG feedback-related RRC parameter may be configured for the (Rel-16) Type-3 codebook, and an NDI feedback-related RRC parameter and a CBG feedback-related RRC parameter may be configured for a list of enhanced Type-3 codebooks. In some implementations, the absence of the respective parameters may mean the absence of NDI information and reporting HARQ-ACK in units of TB, respectively. For example, if the NDI feedback-related RRC parameter exists in a configuration for the (Rel-16) Type-3 codebook or a configuration for the list of enhanced Type-3 codebooks, the UE includes the NDI in each HARQ-ACK reported through a corresponding Type-3 codebook. If the NDI feedback-related RRC parameter does not exist in the configuration for the (Rel-16) Type-3 codebook or the configuration for the list of enhanced Type-3 codebooks, the UE does not include the NDI in each HARQ-ACK reported through a corresponding Type-3 codebook. As another example, if the CBG feedback-related RRC parameter exists in the configuration for the (Rel-16) Type-3 codebook or the configuration for the list of enhanced Type-3 codebooks, the UE reports CBG-level HARQ-ACK for each CC (i.e., serving cell) for which CBG-level transmission is configured. If the CBG feedback-related RRC parameter does not exist in the configuration for the (Rel-16) Type-3 codebook or the configuration for the list of enhanced Type-3 codebooks, the UE reports TB-level HARQ-ACK (even when CBG-level transmission is configured for a CC).

Method 2_2: A pair of an RRC parameter for determining whether the NDI information is included and an RRC parameter for determining whether HARQ-ACK is reported in units of CBG may be configured with respect to each enhanced Type-3 codebook in addition to an RRC parameter for determining whether the NDI information is included and an RRC parameter for determining whether HARQ-ACK is reported in units of CBG with respect to the (Rel-16) Type-3 codebook. The pair of RRC parameters may determine whether the NDI information of an associated enhanced Type-3 codebook is included and whether HARQ-ACK is reported in units of CBG. In some implementations, the absence of the respective parameters may mean the absence of NDI information and reporting HARQ-ACK in units of TB, respectively. For example, if an NDI feedback-related RRC parameter exists in a configuration for any (Rel-16 or enhanced) Type-3 codebook, the UE includes the NDI in each HARQ-ACK reported through a corresponding Type-3 codebook. If the NDI feedback-related RRC parameter does not exist in the configuration for the Type-3 codebook, the UE does not include the NDI in each HARQ-ACK reported through the corresponding Type-3 codebook. As another example, if a CBG feedback-related RRC parameter exists in the configuration for any (Rel-16 or enhanced) Type-3 codebook, the UE that has received DCI requesting transmission of the Type-3 codebook reports CBG-level HARQ-ACK for a CC (i.e., serving cell) for which CBG-level transmission is configured. If the CBG feedback-related RRC parameter does not exist in the configuration for the (Rel-16 or enhanced) Type-3 codebook, the UE that has received the DCI requesting transmission of the Type-3 codebook reports TB-level HARQ-ACK through the corresponding Type-3 codebook (even when CBG-level transmission is configured for a CC). Associated HARQ process(es) may differ according to configured (enhanced) Type-3 codebooks and the number of HARQ processes for which HARQ-ACK information is to be transmitted may also differ. Accordingly, UCI payload sizes may be different according to the configured Type-3 codebooks. Method 2_2 allows the BS to differently configure whether the NDI is included and whether CBG-level HARQ-ACK is transmitted with respect to each codebook, so that the BS may adjust the reliability of PUCCH transmission and adjust the payload size of a HARQ-ACK codebook to be suitable for the usage/purpose of the HARQ-ACK codebook.

Method 2_3: The RRC parameter for determining whether the NDI information of the (Rel-16) Type-3 codebook is included and the RRC parameter for determining whether HARQ-ACK is reported in units of CBG may also determine whether the NDI information is included and HARQ-ACK of a CBG unit is reported with respect to all enhanced Type-3 codebooks. In some implementations of the present disclosure, the absence of the respective parameters may mean the absence of NDI information and reporting HARQ-ACK in units of TB.

Figure 19:
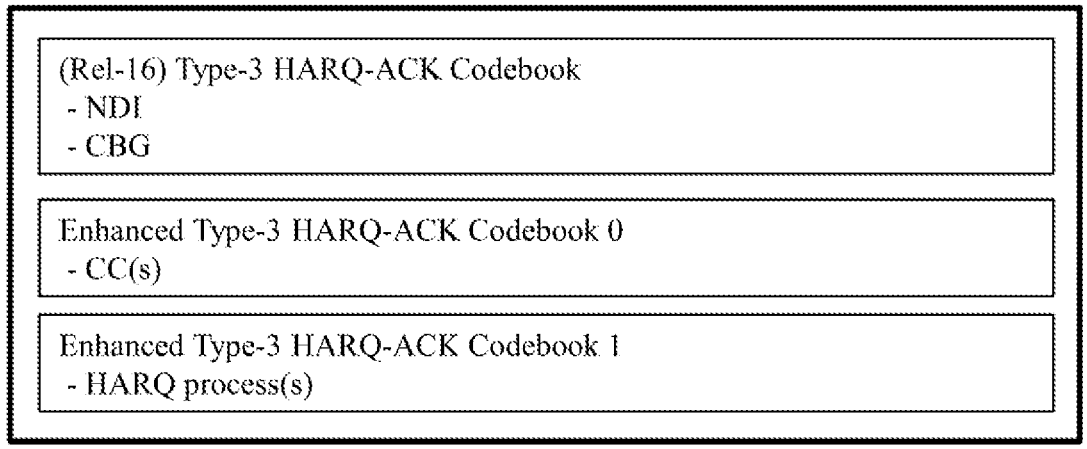

FIGS. 17 to 19 illustrate HARQ process-based HARQ-ACK codebook configurations according to some implementations of the present disclosure. In particular, FIG. 17 is an example of a Type-3 HARQ-ACK codebook configuration according to Method 2_1, FIG. 18 is an example of a Type-3 HARQ codebook configuration according to Method 2_2, and FIG. 19 is an example of a Type-3 HARQ-ACK codebook configuration according to Method 2_3. In the examples of FIGS. 17 to 19, HARQ process(es) are parameters for configuring HARQ process(es) for which corresponding HARQ-ACK information is to be included in a corresponding Type-3 HARQ-ACK codebook, and CC(s) are parameters for configuring serving cell(s) in which corresponding HARQ-ACK information is to be included in a corresponding Type-3 HARQ-ACK codebook. In some implementations of the present disclosure, CC(s) and/or HARQ process(es) associated with a Type-3 HARQ-ACK codebook may be configured according to Implementation 1 described above. In the examples of FIGS. 17 to 19, for convenience of description, a situation is assumed in which a Rel-16 Type-3 HARQ-ACK codebook and two enhanced HARQ-ACK codebooks are configured for the UE. FIGS. 17 to 19 illustrate examples in which the absence of an NDI feedback-related parameter and a CBG feedback-related parameter means the absence of NDI information in a Type-3 HARQ-ACK codebook and TB-level HARQ-ACK feedback. However, in other implementations of the present disclosure, the NDI feedback-related parameter may include a value indicating that NDI information is included in a corresponding Type-3 HARQ-ACK codebook or a value indicating NDI information is not included in a corresponding Type-3 HARQ-ACK codebook, and the CBG-related parameter includes a value indicating HARQ-ACK report of a CBG unit or a value indicating HARQ-ACK report of a TB unit.

For example, three serving cells of cell #0, cell #1, and cell #2 may be configured for the UE, HARQ processes #0 to #5 may be configured for cell #0, HARQ processes #0 to #5 may be configured for cell #1, HARQ processes #0 to #3 may be configured for cell #2, and a Rel-16 Type-3 codebook, enhanced Type-3 HARQ-ACK codebook 0 in which cell #0 and cell #2 are configured, and enhanced Type-3 HARQ-ACK codebook 1 in which HARQ processes #0 and #2 of cell #1 are configured may be configured for the UE by the BS. In this case, in some implementations, according to Method 2_2, NDI feedback and CBG feedback may be configured for the Rel-16 Type-3 HARQ-ACK codebook, NDI feedback may be configured for enhanced Type-3 HARQ-ACK codebook 0, and NDI feedback and CBG feedback may be configured for enhanced Type-3 HARQ-ACK codebook 1. In a state in which the maximum number of codewords that may be scheduled by DCI for cell #1 is set to 2, if the UE receives DCI including indication about enhanced Type-3 HARQ-ACK codebook 1, the UE may generate a HARQ-ACK codebook, including HARQ-ACK information bits for each of CBGs of a first TB for HARQ process #0 of cell #1, an NDI value indicated by DCI associated with HARQ process #0 for the first TB for HARQ process #0, HARQ-ACK information bits for each of CBGs of a second TB for HARQ process #0 of cell #1, an NDI value indicated by the DCI associated with HARQ process #0 for the second TB for HARQ process #0, HARQ-ACK information bits for each of CBGs of a first TB for HARQ process #2 of cell #1, an NDI value indicated by DCI associated with HARQ process #2 for the first TB for HARQ process #2, HARQ-ACK information bits for each of CBGs of a second TB for HARQ process #2 of cell #1, and an NDI value indicated by the DCI associated with HARQ process #2 for the second TB for HARQ process #2.

<Implementation 3> Multiplexing of HARQ-ACK Codebook Retransmission

In the process of the UE performing HARQ-ACK retransmission using the methods in Implementation 1 described above, a situation may occur in which initial HARQ-ACK transmission different from HARQ-ACK retransmission is scheduled in one slot. If initial HARQ-ACK transmission and HARQ-ACK retransmission are scheduled in one slot, in some implementations, the UE may configure one HARQ-ACK information by appending HARQ-ACK information of HARQ-ACK retransmission following HARQ-ARQ information of initial HARQ-ACK transmission.

In some implementations, when a Type-3 codebook or an enhanced Type-3 codebook is scheduled, initial transmission of other HARQ-ACKs may be excluded and only the Type-3 codebook or the enhanced Type-3 codebook may be transmitted. This is because HARQ-ACK information of other previously scheduled PDSCHs may be included in the Type-3 codebook due to the characteristics of the Type-3 codebook operating based on a HARQ process.

In the process of the UE performing HARQ-ACK retransmission using the methods in Implementation 1 described above, when a plurality of HARQ-ACKs to be transmitted through one-shot HARQ-ACK retransmission is retransmitted in one slot T, the UE may construct one HARQ-ACK UCI by concatenating each retransmitted HARQ-ACK codebook in time order of an initial slot before retransmission. For example, if N PUCCHs that have been scheduled in slot(s) $T_1, T_2, \ldots, T_{N-1}$ ($T_n < T_m$ if n<m) are retransmitted in slot T, the UE constructs a codebook including $\{H_1, H_2, \ldots H_{N-1}\}$ obtained by concatenating N HARQ-ACK codebook(s) $H_1, H_2, \ldots H_{N-1}$ from slot(s) $T_1, T_2, \ldots, T_{N-1}$ in order of the slots or constructs one HARQ-ACK UCI X including $\{H_{N-1}, H_{N-2}, \ldots, H_1\}$ obtained by concatenating N HARQ-ACK codebook(s) in the reverse order of the slots.

In the process of the UE performing HARQ-ACK retransmission using the methods in Implementation 1 described above, when the (Rel-16) Type-3 codebook and the enhanced Type-3 codebook(s) are scheduled in one slot T, the UE may construct one HARQ-ACK UCI Y by concatenating each HARQ-ACK codebook in the order of the (Rel-16) Type-3 codebook and then in the order of an associated configuration index of each enhanced Type-3 codebook. In this case, the following methods may be additionally considered.

When transmission of one or more (Rel-16) Type-3 codebooks and/or one or more enhanced Type-3 codebooks is indicated for slot T, other Type-3 codebooks except for the last indicated codebook (e.g., an ending symbol of a PDCCH through which triggering DCI for transmission of a corresponding Type-3 codebook is received is the last symbol) may be excluded from transmission and UCI Y.

As another example, when transmission of a (Rel-16) Type-3 codebook is scheduled in slot T, other enhanced Type-3 codebooks in slot T may be excluded from transmission and UCI Y.

When a plurality of enhanced Type-3 codebooks is scheduled to be transmitted in slot T, other enhanced Type-3 codebooks except for an enhanced Type-3 codebook with the lowest configuration index may be excluded from transmission and UCI Y.

If there is initial HARQ-ACK transmission scheduled in slot T and a plurality of HARQ-ACKs, which is a target of one-shot HARQ-ACK retransmission, is retransmitted in one slot T, the UE may construct one HARQ-ACK information by appending UCI X configured for one-shot HARQ-ACK retransmission following HARQ-ACK information of corresponding initial HARQ-ACK transmission.

If there is initial HARQ-ACK transmission scheduled in slot T, and the (Rel-16) Type-3 codebook and/or the enhanced Type-3 codebook is scheduled in slot T, the UE may construct one HARQ-ACK information by appending UCI Y following HARQ-ACK information of corresponding initial HARQ-ACK transmission.

If there is initial HARQ-ACK transmission scheduled in slot T, a (Rel-16) Type-3 codebook and/or an enhanced Type-3 codebook is scheduled in slot T, and a plurality of HARQ-ACKs to be retransmitted through one-shot HARQ-ACK retransmission is retransmitted in one slot T, the UE may construct one HARQ-ACK information by appending UCI X configured for one-shot HARQ-ACK retransmission following HARQ-ACK information of initial HARQ-ACK transmission and then appending UCI Y to it. Alternatively, the UE may construct one HARQ-ACK information (i.e., one HARQ-ACK codebook) by appending UCI Y following the HARQ-ACK information of initial HARQ-ACK transmission and then appending UCI X configured for one-shot HARQ-ACK retransmission to it.

As another example, when transmission of one or more (Rel-16) Type-3 codebooks and/or one or more enhanced Type-3 codebooks is indicated for slot T, the UE may exclude one-shot HARQ-ACK retransmission and/or initial HARQ-ACK transmission scheduled in slot T from transmission in slot T. That is, the Type-3 codebooks may be given priority over one-shot HARQ-ACK retransmission. This is because there is a high possibility that the (Rel-16) Type-3 codebooks and the enhanced Type-3 codebooks will include status information of HARQ process(es) provided to the BS through one-shot HARQ-ACK retransmission or general HARQ-ACK transmission since the (Rel-16) Type-3 codebooks and the enhanced Type-3 codebooks are HARQ process-based HARQ codebooks.

<Implementation 4> Offset Indication of One-Shot HARQ-ACK Retransmission

The UE may receive DCI X that explicitly or implicitly indicates a previously scheduled PUCCH or PDSCH for the UE from the BS and retransmit a PUCCH indicated by DCI X, a HARQ-ACK codebook included in the PUCCH, or a HARQ-ACK response corresponding to a PDSCH. In some implementations, a UCI payload during retransmission may be a UCI payload generated based on a slot in which HARQ-ACK transmission for which retransmission is required is previously scheduled.

When the UE is indicated to perform one-shot HARQ-ACK retransmission, the UE may additionally receive an offset indicator through which HARQ-ACK transmission for which retransmission is requested explicitly indicates a previously scheduled PUCCH or PDSCH. For example, the following methods may be considered.

- The offset indicator may indicate a slot offset within a retransmission range of one-shot HARQ-ACK retransmission (e.g., a maximum slot length, the number of slots, or a set of slots in which retransmission may be requested/indicated by retransmission indication) from the reference point.
  - The retransmission range of one-shot HARQ-ACK retransmission may be configured through higher layer signaling of the BS or may be a predefined value (e.g., 15 or 16 slots). Alternatively, the largest value among PDSCH-to-HARQ-ACK timing values configured for the UE may be assumed as the retransmission range.
  - As another example, if one-shot HARQ-ACK retransmission is performed through a set of slot offsets, configured by higher layer signaling of the BS (i.e., if a PUCCH separated by a slot offset associated with an indicated index from a scheduled PUCCH is retransmitted by indicating an index of a slot offset in the set of slot offsets), the retransmission range of one-shot HARQ-ACK retransmission may represent the number of configured slot offsets, i.e., a set of slot offsets. In other words, slots in which retransmission may be indicated to be performed by retransmission indication may be limited to slots that may be indicated by the set of the configured slot offsets.

- This offset indicator may indicate a previously scheduled PUCCH or PDSCH in units of slot offsets with respect to the following criteria together with one-shot HARQ-ACK retransmission indication.
  - A slot offset for the previously scheduled PUCCH or PDSCH may be indicated based on a PUCCH scheduled through the one-shot HARQ-ACK retransmission indication. For example, when the UE is indicated to transmit, in slot n+k, a HARQ-ACK codebook that the UE transmitted or would transmit in slot m or a HARQ-ACK codebook for PDSCH reception within slot m, through one-shot HARQ-ACK retransmission indication received in slot n, the UE may determine slot n+k−L as slot m based on slot offset L received together with the one-shot HARQ-ACK retransmission indication.
  - As another example, the slot offset for the previously scheduled PUCCH or PDSCH may be indicated based on a reception time of the one-shot HARQ-ACK retransmission indication. For example, when the UE is indicated to transmit, in slot n+k, the HARQ-ACK codebook that the UE transmitted or would transmit in slot m or a HARQ-ACK codebook for PDSCH reception in slot m through the one-shot HAR-ACK retransmission indication (in the PDCCH) ending in slot n, the UE may determine slot n−L as slot m based on slot offset L received together with the one-shot HARQ-ACK retransmission indication.
  - As another example, the slot offset for the previously scheduled PUCCH or PDSCH may be indicated based on a PDSCH scheduled through the one-shot HARQ-ACK retransmission indication. For example, when the UE is indicated to transmit, in slot n+k, the HARQ-ACK codebook that the UE transmitted or would transmit in slot m or a HARQ-ACK codebook for PDSCH reception in slot m through one-shot HAR-ACK retransmission indication that ends in slot n and is received in a PDCCH scheduling a PDSCH in slot n+K0, the UE may determine slot n+K0−L as slot m based on slot offset L received together with one-shot HARQ-ACK retransmission indication.

When one-shot HARQ-ACK retransmission indication schedules a PUCCH of a certain priority index and retransmission is performed through the PUCCH of the priority and when PUCCH transmission of a subslot unit is configured to be performed in a PUCCH configuration for the corresponding priority index, a slot offset may also be applied in units of subslots. That is, when a subslot is configured, a slot offset of 1 may be used to indicate a subslot separated by one subslot from a reference time to which the corresponding slot offset is applied.

In some implementations, when the offset indicator indicates a slot offset of 0 (i.e., zero offset), the slot offset of 0 may mean that the UE does not perform one-shot HARQ-ACK retransmission.

In some implementations, when the UE is not configured to use HARQ-ACK retransmission schemes other than one-shot HARQ-ACK retransmission, only the offset indicator of length M may be added to DCI as an additional information field.

The length of the additional information field, i.e., M bits, may be determined through ceil($\log_2(R)$), where R is a retransmission range of one-shot HARQ-ACK retransmission.

When a scheduled or retransmitted PUCCH is not confined to one subslot, it is necessary to determine a subslot to which each PUCCH belongs in order to apply a slot offset of a subslot level. In particular, when a reception time of the PDSCH or one-shot HARQ-ACK retransmission indication becomes a reference, the same problem may occur due to a different SCS between UL and DL. To solve this problem, the following methods may be considered.

To determine a UL (sub-)slot corresponding to the reception time of one-shot HARQ-ACK retransmission indication, which is the reference of a slot offset indicating a target UL slot/subslot of HARQ-ACK retransmission (e.g., slot offset=0), one of the following methods may be used.

A UL (sub-)slot overlapping with the starting or first symbol of a PDCCH receiving one-shot HARQ-ACK retransmission indication A UL (sub-)slot overlapping with the ending or last symbol of the PDCCH receiving one-shot HARQ-ACK retransmission indication A UL (sub-)slot overlapping with the starting or first symbol of a DL slot in which one-shot HARQ-ACK retransmission indication is received or the first UL (sub-)slot overlapping with the corresponding DL slot A UL (sub-)slot overlapping with the ending or last symbol of the DL slot in which one-shot HARQ-ACK retransmission indication is received or the last UL (sub-)slot overlapping with the corresponding DL slot To determine a UL (sub-)slot corresponding to the reception time of a PDSCH, which is the reference of a slot offset indicating a target UL slot/subslot of HARQ-ACK retransmission (e.g., slot offset=0), one of the following methods may be used.

A UL (sub-)slot overlapping with the starting or first symbol of the PDSCH

A UL (sub-)slot overlapping with the ending or last symbol of the PDSCH

A UL (sub-)slot overlapping with the starting or first symbol of a DL slot in which the PDSCH is received or the first UL (sub-)slot overlapping with the corresponding DL slot A UL (sub-)slot overlapping with the ending or last symbol of the DL slot in which the PDSCH is received or the last UL (sub-)slot overlapping with the corresponding DL slot To determine a UL (sub-)slot of a scheduled or retransmitted PUCCH, one of the following methods may be used.

A UL (sub-)slot overlapping with the starting or first symbol of the corresponding PUCCH A UL (sub-)slot overlapping with the ending or last symbol of the corresponding PUCCH Based on the above description, the UE may receive the offset indicator and perform PUCCH retransmission therethrough. For example, when a previously scheduled PUCCH or PDSCH is indicated in units of slot offsets based on a newly scheduled PUCCH, together with one-shot HARQ-ACK retransmission indication, if DCI received in slot n−K0 schedules a PDSCH of slot n, a HARQ-ACK PUCCH of slot n+K is scheduled through a HARQ-ACK timing of K, and the offset indicator indicates slot offset L, the UE may retransmit a HARQ-ACK codebook that has been or should have been included in PUCCH transmission of slot n+K−L in a HARQ-ACK PUCCH of n+K.

<Implementation 5> Preserving Latest UCI Payload for One-Shot HARQ-ACK Retransmission The UE may receive DCI X (e.g., one-shot retransmission triggering DCI X) that explicitly or implicitly indicates a previously scheduled PUCCH or PDSCH from the BS and retransmit a PUCCH indicated by DCI X, a HARQ-ACK codebook included in the PUCCH, or a HARQ-ACK response corresponding to a PDSCH. A UCI payload during retransmission may be a UCI payload generated based on a previously scheduled slot.

In this case, the UE that may receive DCI X needs to store a UCI payload (e.g., Type-1 and/or Type-2 HARQ-ACK codebook) which is scheduled to be transmitted or is transmitted in corresponding slots based on the range of slots that DCI X may indicate or needs to store related information, for example, the status of a HARQ process in a corresponding slot (e.g., whether an associated TB is successfully received), so as to regenerate the UCI payload. For example, if a slot range that the one-shot retransmission triggering DCI X may indicate is [n, m] so that HARQ-ACK transmission of a total of m−n+1 slot(s) may be indicated, the UE should store a UCI payload which is scheduled to be transmitted or is transmitted in m−n+1 slot(s) or preserve information capable of regenerating the UCI payload. The UCU payload, particularly, the size of the HARQ-ACK codebook, may greatly increase depending on a codebook construction method and a BS configuration, and the UCI payload may be transmitted in every slot. Considering this situation, the UE needs to prepare a storage space (storage device or memory space) of a sufficient size to preserve UCI payloads which are transmitted or scheduled to be transmitted within a given range, which may cause a great burden on the implementation of the UE. Therefore, in some implementations of the present disclosure, the number of UCI payloads stored by the UE is limited in order to alleviate the burden of the UE implementation. In other words, in preparation for HARQ-ACK retransmission, the UE needs to store every HARQ-ACK transmission so as to be retransmitted later (because the BS may instruct the UE to perform HARQ-ACK retransmission later). In this case, in order to alleviate the burden on the UE implementation, in some implementations of the present disclosure, the number of HARQ-ACK transmissions that the UE may store may be limited. If the number of UCI payloads that the UE may store is limited to 2, the BS may have to indicate only retransmission for two HARQ-ACKs that have been recently transmitted or are scheduled to be transmitted. For this purpose, at least one of the following methods may be considered.

Method 5_1: The BS may perform HARQ-ACK scheduling or UCI scheduling for the UE only K times during a time window of length T. In other words, the number of HARQ-ACK codebooks or UCI payloads that should have been transmitted during a window of length T may be limited to K. For example, the BS may schedule a maximum of K HARQ-ACK codebook(s) or UCI payload(s) during a time window of length T for the UE. In other words, the BS may not perform HARQ-ACK scheduling or UCI scheduling more than K times in any time window of time length T. Therethrough, the UE may store a maximum of K HARQ-ACK codebook(s) or UCI payload(s) and retransmit a HARQ-ACK response.

The time length T may be T=m−n+1 when the slot range that one-shot retransmission triggering DCI X may indicate is [n, m].

The slot range that one-shot retransmission triggering DCI X may indicate may be determined by capability signaling of the UE or may be determined through L1 signaling (e.g., PDCCH) and/or higher layer signaling of the BS within a range determined by capability signaling of the UE. When the UE is configured to generate and transmit HARQ-ACK codebooks having different priorities, the UE may receive, from the BS, indication or configuration for a slot range that one-shot retransmission triggering DCI X may indicate with respect to each priority. Alternatively, the UE may report a slot range that triggering DCI X may indicate with respect to each priority to the BS through capability signaling. The UE and the BS may use a predefined slot range (with respect to each priority) based on capability signaling of the UE.

In some implementations, K may be determined by capability signaling of the UE or through L1 signaling (e.g., PDCCH) and/or higher layer signaling of the BS or may be determined through L1 signaling (e.g., PDCCH) or higher layer signaling of the BS within a range determined by capability signaling of the UE.

Method 5_2: To retransmit a HARQ-ACK response, the UE may store a maximum of K HARQ-ACK codebook(s) or information for generating the K HARQ-ACK codebook(s). When the UE stores the information about the K HARQ-ACK codebook(s), if the BS additionally schedules another HARQ-ACK transmission, the UE may include information about a HARQ-ACK codebook of additionally scheduled new HARQ-ACK transmission, except for information about a HARQ-ACK codebook which has been transmitted first or is to be transmitted first or information about a HARQ-ACK codebook which has been scheduled first, in a UCI payload for one-shot HARQ-ACK retransmission. That is, the UE may store only information about the latest K HARQ-ACK transmission(s) and the HARQ-ACK codebook(s) therefor.

In some implementations, K may be determined by capability signaling of the UE or through L1 signaling (e.g., PDCCH) and/or higher layer signaling of the BS or may be determined through L1 signaling (e.g., PDCCH) or higher layer signaling of the BS within a range determined by capability signaling of the UE.

In some implementations, K may be defined as a value less than or equal to the number (e.g., N) of slots belonging to a slot range (that one-shot retransmission triggering DCI X may indicate), and the K value may be regulated as the capability of the UE so that respective UEs may support different K values even for the same N value. For example, each UE may report a K value that is supportable thereby to the BS as information related to the capability thereof Upon receiving a retransmission trigger of a HARQ-ACK response to a HARQ-ACK codebook not stored in the UE, the UE may ignore the retransmission trigger and/or DCI including the retransmission trigger and consider that the retransmission trigger and/or the DCI has not been received. Alternatively, the UE may ignore only information necessary for retransmission of the HARQ-ACK response among information included in the corresponding DCI.

In using Implementation 5, whether Implementation 5 is used and a related value may be determined by capability signaling of the UE and/or through L1 signaling (e.g., PDCCH) and/or higher layer signaling of the BS. Such indication or configuration may be indicated or configured according to each priority of the HARQ-ACK codebook. As an example, the maximum number of schedulable HARQ-ACK transmissions may be configured according to each priority. If the UE supports inter-priority intra-UE UL multiplexing so that UCI and/or UL-SCH transmission scheduled with different HARQ-ACK codebook priorities or different priority indicators may be performed in one PUCCH and/or PUSCH resource, the time length T and the number K of HARQ-ACK transmissions may use the smallest value among values configured for respective priorities in order to facilitate the implementation of the UE, use the largest value among the values configured for respective priorities in order to secure scheduling flexibility, or use the sum of values configured for respective priorities.

<Implementation 6> Codebook-Based HARQ-ACK Retransmission with Intra-UE Multiplexing If at least one HARQ-ACK retransmission method is configured for the UE and the UE supports inter-priority intra-UE UL multiplexing so as to perform UCI and/or UL-SCH transmission scheduled by different HARQ-ACK codebook priorities or different priority indicators on one PUCCH and/or PUSCH resource, the UE may consider, in performing HARQ-ACK retransmission, priorities of retransmitted HARQ-ACK codebooks, a priority of a PUCCH determined during scheduling, and a priority indicator included in DCI that indicates HARQ-ACK retransmission.

If a HARQ-ACK retransmission method configured for the UE is codebook-based one-shot HARQ-ACK retransmission, for example, if the HARQ-ACK retransmission method configured for the UE is performed by receiving DCI X (e.g., one-shot retransmission triggering DCI X) that explicitly or implicitly indicates a previously scheduled PUCCH or PDSCH from the BS and retransmitting a PUCCH indicated by DCI X, a HARQ-ACK codebook included in the PUCCH, or a HARQ-ACK response corresponding to a PDSCH, the UE may apply at least one of the following operations, in consideration of a priority indicator included in the one-shot retransmission triggering DCI, when inter-priority intra-UE UL multiplexing is not configured for the UE or a HARQ-ACK codebook, a UCI payload, or a PUCCH and/or a PUSCH is configured with a single priority.

A previously scheduled PDSCH indicated by the one-shot retransmission triggering DCI may be limited to a PDSCH having the same priority as a priority indicated by the priority indicator.

A previously scheduled PUCCH indicated by the one-shot retransmission triggering DCI may be limited to a PUCCH having the same priority as the priority indicated by the priority indicator.

A HARQ-ACK codebook indicated by the one-shot retransmission triggering DCI may be limited to a HARQ-ACK codebook having the same priority as the priority indicated by the priority indicator or having a codebook index indicated by the priority indicator.

A priority of a PUSCH and/or PUCCH scheduled by the one-shot retransmission triggering DCI is the same as the priority indicated by the priority indicator.

When the HARQ-ACK retransmission method configured for the UE is codebook-based one-shot HARQ-ACK retransmission and inter-priority intra-UE UL multiplexing is configured for the UE, the UE and the BS may perform at least one of the following operations, in consideration of the priority indicator included in the one-shot retransmission triggering DCI, with respect to HARQ-ACK codebooks or UCI payloads having different priorities or PUCCH(s) and/or PUSCH(s) having different priorities.

Method 6_1A: A target of one-shot HARQ-ACK retransmission may be selected based on scheduled HARQ-ACK transmission regardless of whether (inter-priority/intra-UE) UL multiplexing is performed. In other words, when the priority indicator of the one-shot HARQ-ACK retransmission triggering DCI indicates a high(er) priority (HP), the UE may retransmit HP HARQ-ACK bits, i.e., only a HP HARQ-ACK codebook, regardless of (inter-priority/intra-UE) UL multiplexing. When the priority indicator indicates a low(er) priority (LP), the UE may retransmit LP HARQ-ACK bits, i.e., only an LP HARQ-ACK codebook, regardless of (inter-priority/intra-UE) UL multiplexing.

This operation may be limited to the case in which LP is indicated.

When different slot lengths for different priorities are configured for a HARQ-ACK codebook and PUCCH scheduling, a slot offset that indicates a previous PUCCH and/or PUSCH of the one-shot HARQ-ACK retransmission triggering DCI may be applied based on the slot length of a priority indicated by the priority indicator of the DCI. For example, if a 7-symbol slot length is configured for HP HARQ-ACK transmission, a slot offset included in the one-shot HARQ-ACK retransmission triggering DCI that indicates HP may be applied by regarding 7 symbols as one slot.

Method 6_2A: The target of one-shot HARQ-ACK retransmission may be selected based on the priority of a PUCCH and/or a PUSCH that has been transmitted or may be/could have been transmitted. In other words, when the priority indicator of the one-shot HARQ-ACK retransmission triggering DCI indicates HP, the UE retransmits HARQ-ACK bits, i.e., a HARQ-ACK codebook, that is transmitted or may be/could have been transmitted in an HP PUCCH and/or PUSCH as a result of (inter-priority/intra-UE) UL multiplexing. When the priority indicator indicates LP, the UE retransmits HARQ-ACK bits, i.e., a HARQ-ACK codebook, that is transmitted or may be/could have been transmitted in an LP PUCCH and/or PUSCH as a result of (inter-priority/intra-UE) UL multiplexing.

When different slot lengths for different priorities are configured for the HARQ-ACK codebook and PUCCH scheduling, a slot offset that indicates a previous PUCCH and/or PUSCH of the one-shot HARQ-ACK retransmission triggering DCI may be applied based on the slot length of a priority indicated by the priority indicator of the DCI. For example, if a 7-symbol slot length is configured for HP HARQ-ACK transmission, a slot offset included in the one-shot HARQ-ACK retransmission triggering DCI that indicates HP may be applied by regarding 7 symbols as one slot.

This operation may be limited to the case in which a slot length smaller than 14 symbols is configured for the HARQ-ACK codebook and PUCCH scheduling.

The case in which a HARQ-ACK response retransmitted through one-shot HARQ-ACK retransmission overlaps with other PUCCHs (in time) may occur. In particular, when inter-priority intra-UE UL multiplexing is configured for the UE, if PUCCHs having different priorities overlap with each other in time, at least one PUCCH may include the retransmitted HARQ-ACK response. In this case, the UE may perform inter-priority intra-UE UL multiplexing in consideration of at least one of the following methods. The BS may receive UL transmission from the UE under the assumption that the UE will perform inter-priority intra-UE UL multiplexing considering at least one of the following methods.

Method 6_1 B: When inter-priority intra-UE UL multiplexing is configured for the UE, a HARQ-ACK response is retransmitted on an LP PUCCH and/or PUSCH through one-shot HARQ-ACK retransmission, and corresponding PUCCH and/or PUSCH transmission overlaps (in time) with a PUCCH/PUSCH including an HP HARQ-ACK or with an LP PUCCH/PUSCH, the UE may perform UL multiplexing only for UCI except for a HARQ-ACK response corresponding to one-shot HARQ-ACK retransmission and may not multiplex (or retransmit) the HARQ-ACK response (corresponding to one-shot HARQ-ACK retransmission).

This operation may be limited to the case in which corresponding PUCCH and/or PUSCH transmission overlaps with a PUCCH or PUSCH including other LP HARQ-ACK codebooks. In other words, the UE may multiplex only one HARQ-ACK information of either a scheduled LP HARQ-ACK codebook or a retransmitted LP HARQ-ACK codebook with HP HARQ-ACK.

Method 6_2 B: When inter-priority intra-UE UL multiplexing is configured for the UE, a HARQ-ACK response is retransmitted on an HP PUCCH and/or PUSCH through one-shot HARQ-ACK retransmission, and corresponding PUCCH and/or PUSCH transmission overlaps with a PUCCH/PUSCH including LP HARQ-ACK or with an LP PUCCH/PUSCH, the UE may retransmit only a HARQ-ACK response corresponding to one-shot HARQ-ACK retransmission without transmitting the PUCCH/PUSCH including LP HARQ-ACK or the LP PUCCH/PUSCH (i.e., by dropping corresponding transmission without multiplexing corresponding LP HARQ-ACK).

This operation may be limited to the case in which corresponding PUCCH and/or PUSCH transmission overlaps with a PUCCH or PUSCH including other HP HARQ-ACK codebooks. In other words, the UE may multiplex only one HARQ-ACK information of either the scheduled HP HARQ-ACK codebook or a retransmitted HP HARQ-ACK codebook with LP HARQ-ACK.

Method 6_3 B: If the number of allocated UCI bits is larger than a UCI payload transmittable to a PUCCH/PUSCH as a result of intra-UE multiplexing, initially scheduled HARQ-ACK bit(s) may be allocated first to the PUCCH/PUSCH, HARQ-ACK bit(s) allocated for one-shot retransmission may be allocated to the remaining space, and other UCI may be allocated to the remaining space.

Figure 20:
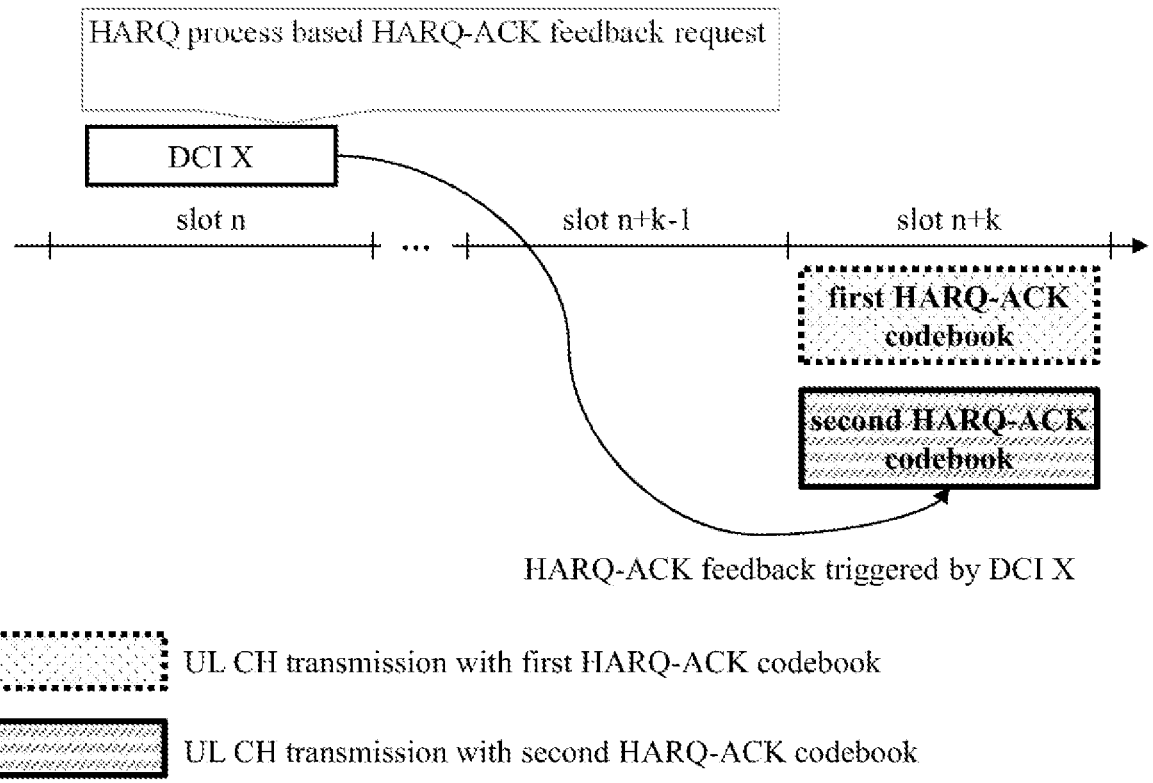
FIG. 20 illustrates HARQ process-based HARQ-ACK transmission according to some implementations of the present disclosure.

<Implementation 7> HARQ Process-Based HARQ-ACK Retransmission with Intra-UE Multiplexing FIG. 20 illustrates HARQ process-based HARQ-ACK transmission according to some implementations of the present disclosure. In an example of FIG. 20, it is assumed that DCI X is DCI including a HARQ process-based HARQ-ACK feedback request to request that a HARQ process-based HARQ-ACK codebook be transmitted in slot n+k. In some implementations, a second HARQ-ACK codebook of FIG. 20 may be a Rel-16 Type-3 HARQ-ACK codebook or an enhanced Type-3 codebook, and a first HARQ-ACK codebook may be a codebook (e.g., Type-1 or Type-2 HARQ-ACK codebook) other than the Type-3 HARQ-ACK codebook. Alternatively, in some implementations, the second HARQ-ACK codebook of FIG. 20 may be the Rel-16 Type-3 HARQ-ACK codebook, and the first HARQ-ACK codebook may be the Type-1, Type-2, or enhanced Type-3 codebook.

When at least one or more of HARQ-ACK retransmission methods are configured for the UE and the UE supports inter-priority intra-UE UL multiplexing to transmit UCI and/or a UL-SCH scheduled by different HARQ-ACK codebook priorities or different priority indicators on one PUCCH and/or PUSCH resource, the UE may consider priorities of retransmitted HARQ-ACK codebooks, a priority of a PUCCH determined during scheduling, and a priority indicator included in DCI that indicates HARQ-ACK retransmission in performing HARQ-ACK retransmission.

If a HARQ-ACK retransmission method configured for the UE is HARQ process-based retransmission, i.e., the Rel-16 Type-3 codebook or the enhanced Type-3 codebook, for example, if the HARQ-ACK retransmission method configured for the UE is performed such that the UE receives DCI that indicates Type-3 HARQ-ACK codebook transmission (i.e., Type-3 triggering DCI) from the BS and reports the HARQ process status for all or some HARQ process(es) (e.g., HARQ-ACK information for the corresponding HARQ process) among HARQ processes of the UE based on information included in the DCI, like the Type-3 HARQ-ACK codebook defined in 9.1.4 of 3GPP TS 38.213 V16, the UE may apply at least one of the following operations in consideration of a priority indicator included in retransmission triggering DCI, when inter-priority intra-UE UL multiplexing is not configured for the UE or a HARQ-ACK codebook, a UCI payload, or a PUCCH and/or a PUSCH is configured with a single priority.

A priority of a PUSCH and/or a PUCCH scheduled by the Type-3 triggering DCI is the same as a priority indicated by the priority indicator in the corresponding Type-3 triggering DCI.

When the HARQ-ACK retransmission method configured for the UE is HARQ process-based retransmission and inter-priority intra-UE UL multiplexing is configured for the UE, the UE may apply at least one of the following operations in relation to the priority indicator included in the Type-3 triggering DCI with respect to HARQ-ACK codebooks or UCI payloads configured with different priorities or PUCCHs and/or PUSCHs having different priorities.

Method 7_1A: When inter-priority intra-UE UL multiplexing is configured for the UE and/or the priority indicator (HP may be indicated therethrough) is included in DCI that schedules at least one of HARQ processes for which the Type-3 HARQ-ACK codebook is to be constructed, the UE may expect that the Type-3 triggering DCI will always indicate HP (i.e., the UE may not expect that LP will be indicated). The BS may always indicate HP through the Type-3 triggering DCI. For example, referring to FIG. 20, DCI X may include the priority indicator configured as HP.

Method 7_2A: When inter-priority intra-UE UL multiplexing is configured for the UE and/or the priority indicator (HP may be indicated therethrough) is included in DCI that schedules at least one of HARQ processes for which the Type-3 HARQ-ACK codebook is to be constructed, the UE may assume that HARQ process-based retransmission always has HP. As an example, when DCI that schedules a PDSCH indicates LP and the UE is indicated to transmit a HARQ-ACK response through the Type-3 HARQ-ACK codebook by the DCI or Type-3 HARQ-ACK codebook triggering DCI, the UE may regard the Type-3 HARQ-ACK codebook and PUCCH transmission which are transmitted and scheduled based on the corresponding DCI as HP. For example, referring to FIG. 20, the UE may regard the second HARQ-ACK codebook, which is a HARQ process-based HARQ-ACK codebook transmitted based on DCI X, or UL channel transmission for the second HARQ-ACK codebook as HP. In addition, the UE may resolve overlapping between other UL channel transmissions for the first HARQ-ACK codebook and UL channel transmission for the second HARQ-ACK codebook or multiplex UL channel transmission for the second HARQ-ACK codebook and other UL channels for the first HARQ-ACK codebook.

When inter-priority intra-UE UL multiplexing is configured for the UE (i.e., when the UE is allowed to multiplex UCI of different priorities, multiplex UCI and UL data of different priorities, and/or multiplex UL data of different priorities by the configuration of the BS), the UE may multiplex, in principle, UL channels of different priorities. For example, the UE for which inter-priority intra-UE UL multiplexing is configured may multiplex HP HARQ-ACK information and LP HARQ-ACK information through a PUCCH or a PUSCH. However, there may be the case in which a HARQ-ACK response transmitted through the HARQ process-based retransmission method overlaps with other PUCCHs (in time). In particular, when inter-priority intra-UE UL multiplexing is configured for the UE and PUCCHs having different priorities overlap with each other in time, at least one PUCCH may include a retransmitted HARQ-ACK response. In this case, in some implementations of the present disclosure, inter-priority intra-UE UL multiplexing may be performed in consideration of at least one of the following methods.

Method 7_1 B: When inter-priority intra-UE UL multiplexing is configured for the UE, the HARQ-ACK response is transmitted on the PUCCH and/or the PUSCH through a HARQ process-based retransmission method (i.e., a HARQ process-based HARQ-ACK codebook is transmitted on the PUCCH and/or the PUSCH as the HARQ-ACK response), and corresponding PUCCH and/or PUSCH transmission overlaps (in time) with a PUCCH/PUSCH including LP HARQ-ACK or with an LP PUCCH/PUSCH, the UE may retransmit only a HARQ-ACK response based on a HARQ process-based HARQ-ACK codebook without transmitting the PUCCH/PUSCH including LP HARQ-ACK or the LP PUCCH/PUSCH. For example, referring to FIG. 20, when the second HARQ-ACK codebook is the HARQ process-based HARQ-ACK codebook and the first HARQ-ACK codebook is associated with LP, the UE may transmit only the second HARQ-ACK codebook in slot n+k without transmitting the first HARQ-ACK codebook. Method 7_1 B may be limited to the case in which the HARQ process-based HARQ-ACK codebook includes the status of all HARQ processes (configured for the UE). The is because, if Method 7_1 B is not limited to the Rel-16 Type-3 HARQ-ACK codebook, a situation may occur in which HARQ-ACK information to which the BS has assigned a high priority or HARQ-ACK information in a PUCCH/PUSCH to which the BS has assigned a low priority may not be provided to the BS due to an enhanced Type-3 HARQ-ACK codebook that does not include corresponding HARQ-ACK information. For example, referring to FIG. 20, when the first HARQ-ACK codebook associated with HP is scheduled to be transmitted in slot n+k, the UE may transmit only the second HARQ-ACK codebook in slot n+k without transmitting the first HARQ-ACK codebook, only if the second HARQ-ACK codebook includes HARQ-ACK information for all HARQ processes configured for the UE (e.g., only if the second HARQ-ACK codebook is the Rel-16 Type-3 HARQ-ACK codebook), although inter-priority intra-UE UL multiplexing is configured for the UE.

Method 7_2 B: When inter-priority intra-UE UL multiplexing is configured for the UE, a HARQ-ACK response is transmitted on a PUCCH and/or a PUSCH through a HARQ process-based retransmission method (i.e., a HARQ process-based HARQ-ACK codebook is transmitted on the PUCCH and/or the PUSCH as a HARQ-ACK response), and corresponding PUCCH and/or PUSCH transmission overlaps (in time) with a PUCCH/PUSCH including HP HARQ-ACK or with an HP PUCCH/PUSCH, the UE may retransmit only a HARQ-ACK response based on the HARQ process-based HARQ-ACK codebook without transmitting the PUCCH/PUSCH including HP HARQ-ACK or the HP PUCCH/PUSCH. For example, referring to FIG. 20, when the second HARQ-ACK codebook is the HARQ process-based HARQ-ACK codebook, the UE may transmit only the second HARQ-ACK codebook in slot n+k without transmitting the first HARQ-ACK codebook even if the first HARQ-ACK codebook associated with HP is scheduled in slot n+k. If the HARQ process-based HARQ-ACK codebook and HARQ-ACK information of the HP PUCCH/PUSCH are simply multiplexed, HARQ-ACK information for one HARQ process may be included twice and there is a risk that a UCI payload will increase unnecessarily (especially, in the case of the Type-3 HARQ-ACK codebook to which all HARQ processes configured for the UE are subjected). However, a process of generating the HARQ-ACK codebook while excluding redundant HARQ-ACK information in order to prevent the UCI payload from increasing is complicated and the UE/BS implementation may be complicated. If the BS requests HARQ process-based HARQ-ACK codebook transmission through DCI, i.e., dynamically, since this means that HARQ-ACK information for HARQ process(es) associated with the HARQ-ACK codebook is required, Method 7_2 B may allow the UE to provide HARQ-ACK information that is urgently required by the BS by prioritizing the HARQ-ACK information over other HP HARQ-ACKs or HP PUCCHs/PUSCHs. In addition, when the BS triggers, through DCI, transmission of HARQ-ACK information for all HARQ processes configured for the UE (i.e., in the case of the Rel-16 Type-3 HARQ-ACK codebook), since HARQ-ACK information that should have been transmitted through the HP PUCCH/PUSCH would also have been included in the HARQ process-based HARQ-ACK codebook, all of the HARQ-ACK information required by the BS may be provided to the BS even if the HP PUCCH/PUSCH is dropped. Therefore, Method 7_2 B may simply prevent the same HARQ-ACK information from being redundantly provided to the BS (i.e., signaling overhead may be simply reduced) while maximally providing HARQ-ACK information required by the BS to the BS. In some implementations, Method 7_2 B may be limited to the case in which the HARQ process-based HARQ-ACK codebook includes the status of all HARQ processes. This is because, if Method 7_2 B is not limited to the Rel-16 Type-3 HARQ-ACK codebook, a situation may occur in which HARQ-ACK information to which a high priority is assigned by the BS or HARQ-ACK information in a PUCCH/PUSCH to which a high priority is assigned by the BS is not provided to the BS due to the enhanced Type-3 HARQ-ACK codebook that does not include corresponding HARQ-ACK information. For example, referring to FIG. 20, when the first HARQ-ACK codebook associated with HP is scheduled to be transmitted in slot n+k, the UE may transmit only the second HARQ-ACK codebook in n+k without transmitting the first HARQ-ACK codebook, only if the second HARQ-ACK codebook includes HARQ-ACK information for all HARQ processes configured for the UE (e.g., only if the second HARQ-ACK codebook is the Rel-16 Type-3 HARQ-ACK codebook), although inter-priority intra-UE UL multiplexing is configured for the UE.

Method 7_3 B: If there are more UCI bit(s) allocated than a UCI payload transmittable through the PUCCH/PUSCH as a result of intra-UE multiplexing, the UE may allocate HARQ-ACK bit(s) allocated by the HARQ process-based retransmission method without allocating HARQ-ACK bit(s) initially scheduled to the corresponding PUSCH/PUSCH and allocate other UCI to the remaining space.

Method 7_4 B: If there are more UCI bit(s) allocated than a UCI payload transmittable to the PUCCH/PUSCH as a result of intra-UE multiplexing, the UE may first allocate only initially scheduled HARQ-ACK bit(s) to the corresponding PUSCH/PUSCH after receiving Type-3 triggering DCI, allocate HARQ-ACK bit(s) allocated by the HARQ process-based retransmission method to the remaining space, and then allocate other UCI to the remaining space.

The above-described implementations of the present disclosure may be applied independently or two or more thereof may be applied together.

In some implementations of the present disclosure, when two or more HARQ-ACK retransmission methods are configured, the UE may be dynamically indicated with a HARQ-ACK retransmission method through small signaling overhead. In addition, in some implementations of the present disclosure, the BS may configure the size of a DCI format of the UE to be as small as possible to minimize the effect of a HARQ-ACK retransmission function on PDCCH reliability. In some implementations of the present disclosure, the same HARQ-ACK information may be prevented from being redundantly provided to the BS while maximally providing HARQ-ACK information required by the BS.

Figure 21:
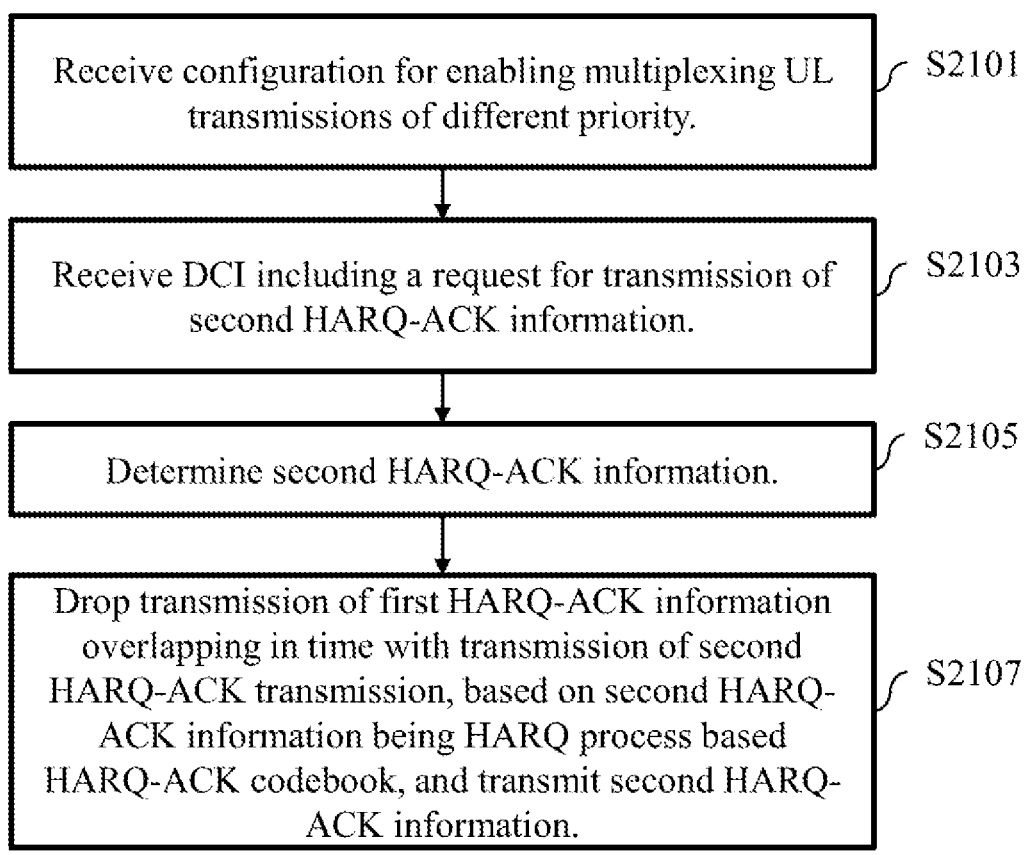
FIG. 21 illustrates a flow of HARQ-ACK information transmission at a UE according to some implementations of the present disclosure.

FIG. 21 illustrates a flow of HARQ-ACK information transmission at a UE according to some implementations of the present disclosure.

The UE may perform operations according to some implementations of the present disclosure in relation to HARQ-ACK transmission. The UE may include: at least one transceiver; at least one processor; and at least one computer memory operably connected to the at least one processor and configured to store instructions that, when executed, cause the at least one processor to perform the operations according to some implementations of the present disclosure. A processing device for a UE may include: at least one processor; and at least one computer memory operably connected to the at least one processor and configured to store instructions that, when executed, cause the at least one processor to perform the operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the UE, processing device, computer-readable (non-volatile) storage medium, and/or computer program product, the operations may comprise: receiving a configuration for enabling multiplexing of UL transmissions of different priorities (S2101); receiving scheduling information related to a first UL channel for transmission of first HARQ-ACK information related to a high priority; receiving DCI including a request for transmission of second HARQ-ACK information (S2103); determining the second HARQ-ACK information based on the DCI (S2105); determining a second UL channel for transmission of the second HARQ-ACK information based on the DCI; and dropping transmission of the first HARQ-ACK information, based on the first uplink channel and the second uplink channel overlapping in time and the second HARQ-ACK information being a HARQ process-based HARQ-ACK codebook, and transmitting the second HARQ-ACK information (S2107).

In some implementations, the operations may include: transmitting UCI including the first HARQ-ACK information and the second HARQ-ACK information, based on the first UL channel and the second UL channel overlapping in time and the second HARQ-ACK information being not the HARQ process-based HARQ-ACK codebook.

In some implementations, dropping transmission of the first HARQ-ACK information, based on the first UL channel and the second UL channel overlapping in time and the second HARQ-ACK information being the HARQ process-based HARQ-ACK codebook, may be performed based on the HARQ process-based HARQ-ACK codebook including HARQ-ACK information for all HARQ processes configured for the UE.

In some implementations, dropping transmission of the first HARQ-ACK information, based on the first UL channel and the second UL channel overlapping in time and the second HARQ-ACK information being the HARQ process-based HARQ-ACK codebook, and transmitting the second HARQ-ACK information may be performed in a state in which the HARQ process-based HARQ-ACK codebook is related to a low priority.

In some implementations, the operations may further include: receiving a configuration for different HARQ-ACK codebooks related respectively to sets of different HARQ processes. The HARQ process-based HARQ-ACK codebook may be one of the different HARQ-ACK codebooks.

Figure 22:
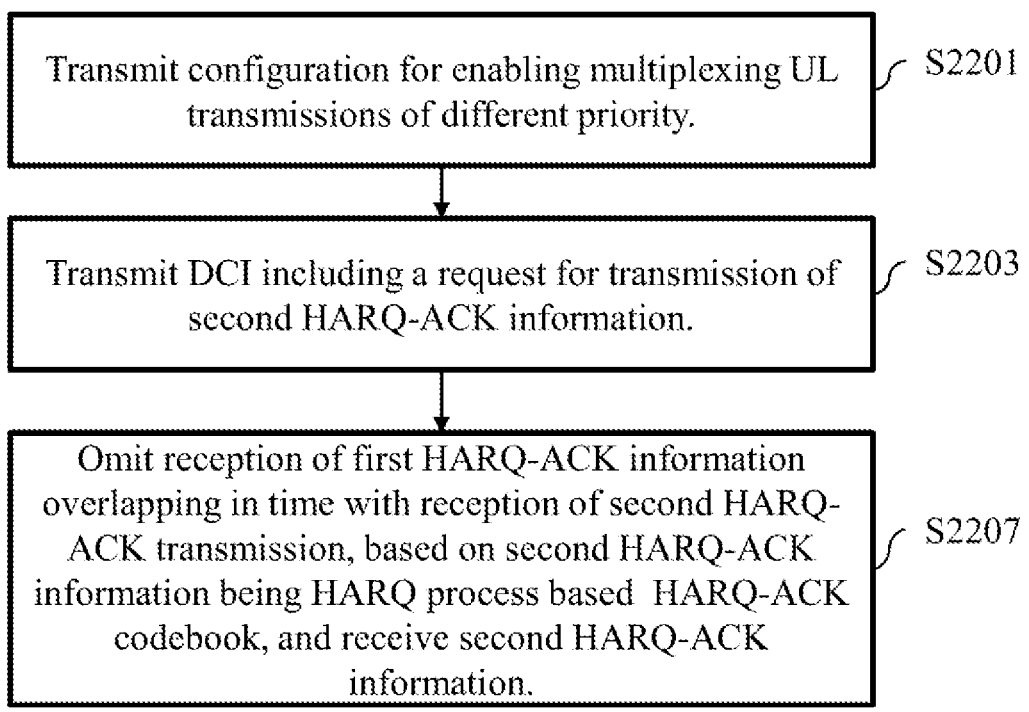
FIG. 22 illustrates a flow of HARQ-ACK information reception at a BS according to some implementations of the present disclosure.

FIG. 22 illustrates a flow of HARQ-ACK information reception at a BS according to some implementations of the present disclosure.

The BS may perform operations according to some implementations of the present disclosure in relation to HARQ-ACK reception. The BS may include: at least one transceiver; at least one processor; and at least one computer memory operably connected to the at least one processor and configured to store instructions that, when executed, cause the at least one processor to perform the operations according to some implementations of the present disclosure. A processing device for a BS may include: at least one processor; and at least one computer memory operably connected to the at least one processor and configured to store instructions that, when executed, cause the at least one processor to perform the operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the BS, processing device, computer-readable (non-volatile) storage medium, and/or computer program product, the operations may comprise: transmitting a configuration for enabling multiplexing of UL transmissions of different priorities to the UE (S2201); transmitting scheduling information related to a first UL channel for first HARQ-ACK information related to a high priority to the UE; transmitting DCI including a request for second HARQ-ACK information to the UE (S2203); determining a second UL channel for the second HARQ-ACK information based on the DCI; and omitting reception of the first HARQ-ACK information, based on the first UL channel and the second UL channel overlapping in time and the second HARQ-ACK information being a HARQ process-based HARQ-ACK codebook, and receiving the second HARQ-ACK information.

In some implementations, the operations may include: receiving UCI including the first HARQ-ACK information and the second HARQ-ACK information, based on the first UL channel and the second UL channel overlapping in time and the second HARQ-ACK information being not the HARQ process-based HARQ-ACK codebook.

In some implementations, omitting reception of the first HARQ-ACK information, based on the first UL channel and the second UL channel overlapping in time and the second HARQ-ACK information being the HARQ process-based HARQ-ACK codebook, may be performed based on the HARQ process-based HARQ-ACK codebook including HARQ-ACK information for all HARQ processes configured for the UE.

In some implementations, omitting reception of the first HARQ-ACK information, based on the first UL channel and the second UL channel overlapping in time and the second HARQ-ACK information being the HARQ process-based HARQ-ACK codebook, and receiving the second HARQ-ACK information may be performed in a state in which the HARQ process-based HARQ-ACK codebook is related to a low priority.

In some implementations, the operations may further include: transmitting a configuration for different HARQ-ACK codebooks related respectively to sets of different HARQ processes to the UE. The HARQ process-based HARQ-ACK codebook may be one of the different HARQ-ACK codebooks.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

What is claimed is:

1. A method performed by a user equipment (UE), the method comprising:
 receiving a configuration for multiple hybrid automatic repeat request (HARQ) process-based HARQ-acknowledgement (HARQ-ACK) codebooks including i) a first HARQ process-based HARQ-ACK codebook related to all HARQ processes configured for the UE and ii) a second HARQ process-based HARQ-ACK codebook related to a part of the HARQ processes configured for the UE;
 receiving a configuration for enabling multiplexing of uplink transmissions of different priorities;
 receiving scheduling information related to a first uplink channel for transmission of first HARQ-ACK information;
 receiving downlink control information including a request for transmission of second HARQ-ACK information;
 determining the second HARQ-ACK information based on the downlink control information;
 determining a second uplink channel for transmission of the second HARQ-ACK information based on the downlink control information;
 based on i) the first uplink channel and the second uplink channel overlapping in time and ii) the first HARQ-ACK information having a high priority:
dropping the transmission of the first HARQ-ACK information and transmitting the second HARQ-ACK information, based on the second HARQ-ACK information being the first HARQ process-based HARQ-ACK codebook, and
multiplexing the second HARQ-ACK information with the first HARQ-ACK information, based on the second HARQ-ACK information being the second HARQ process-based HARQ-ACK codebook, and
 based on i) the first uplink channel and the second uplink channel overlapping in time and ii) the first HARQ-ACK information having a low priority:
dropping the transmission of the first HARQ-ACK information and transmitting the second HARQ-ACK information, based on the second HARQ-ACK information being the first HARQ process-based HARQ-ACK codebook, and
multiplexing the second HARQ-ACK information with the first HARQ-ACK information, based on the second HARQ-ACK information being the second HARQ process-based HARQ-ACK codebook.

2. The method of claim 1, wherein the first and second HARQ process-based HARQ-ACK codebooks are considered to have the low priority irrespective of priority indicated for a HARQ process included in the first and second HARQ process-based HARQ-ACK codebooks.

3. The method of claim 1, wherein the transmission of the second HARQ-ACK information has a different priority from a priority of the transmission of the first HARQ-ACK information.

4. The method of claim 1, further comprising:
 based on i) multiplexing the second HARQ-ACK information with the first HARQ-ACK information and ii) a size of uplink control information (UCI) including the multiplexed first and second HARQ-ACK information being greater than a size of a UCI payload of a physical uplink channel for the multiplexed first and second HARQ-ACK information, mapping the second HARQ-ACK information first onto the physical uplink channel and then mapping the first HARQ-ACK information onto a remaining space of the physical uplink channel after mapping the second HARQ-ACK information onto the physical uplink channel.

5. The method of claim 4, further comprising:
 based on there being another remaining space of the physical uplink channel after mapping the multiplexed first and second HARQ-ACK information onto the physical uplink channel and there being a remaining UCI, mapping a part of the remaining UCI onto the physical uplink channel.

6. A user equipment (UE) comprising:
 at least one transceiver;
 at least one processor; and
 at least one computer memory operably connected to the at least one processor and configured to store instructions that, when executed, cause the at least one processor to perform operations comprising:
 receiving a configuration for multiple hybrid automatic repeat request (HARQ) process-based HARQ-acknowledgement (HARQ-ACK) codebooks including i) a first HARQ process-based HARQ-ACK codebook related to all HARQ processes configured for the UE and ii) a second HARQ process-based HARQ-ACK codebook related to a part of the HARQ processes configured for the UE;
receiving a configuration for enabling multiplexing of uplink transmissions of different priorities;
 receiving scheduling information related to a first uplink channel for transmission of first HARQ-ACK information;
 receiving downlink control information including a request for transmission of second HARQ-ACK information;
 determining the second HARQ-ACK information based on the downlink control information;
 determining a second uplink channel for transmission of the second HARQ-ACK information based on the downlink control information;
 based on i) the first uplink channel and the second uplink channel overlapping in time and the first HARQ-ACK information having a high priority:
dropping the transmission of the first HARQ-ACK information and transmitting the second HARQ-ACK information, based on the second HARQ-ACK information being the first HARQ process-based HARQ-ACK codebook, and
multiplexing the second HARQ-ACK information with the first HARQ-ACK information, based on the second HARQ-ACK information being the second HARQ process-based HARQ-ACK codebook, and based on i) the first uplink channel and the second uplink channel overlapping in time and ii) the first HARQ-ACK information having a low priority:
dropping the transmission of the first HARQ-ACK information and transmitting the second HARQ-ACK information, based on the second HARQ-ACK information being the first HARQ process-based HARQ-ACK codebook, and
multiplexing the second HARQ-ACK information with the first HARQ-ACK information, based on the second HARQ-ACK information being the second HARQ process-based HARQ-ACK codebook.

7. The UE of claim 6, wherein the first and second HARQ process-based HARQ-ACK codebooks are considered to have the low priority irrespective of priority indicated for a HARQ process included in the first and second HARQ process-based HARQ-ACK codebooks.

8. The UE of claim 6, wherein the transmission of the second HARQ-ACK information has a different priority from a priority of the transmission of the first HARQ-ACK information.

9. The UE of claim 6, wherein the operations further comprise:
based on i) multiplexing the second HARQ-ACK information with the first HARQ-ACK information and ii) a size of uplink control information (UCI) including the multiplexed first and second HARQ-ACK information being greater than a size of a UCI payload of a physical uplink channel for the multiplexed first and second HARQ-ACK information, mapping the second HARQ-ACK information first onto the physical uplink channel and then mapping the first HARQ-ACK information onto a remaining space of the physical uplink channel after mapping the second HARQ-ACK information onto the physical uplink channel.

10. The UE of claim 9, wherein the operations further comprise:
based on there being another remaining space of the physical uplink channel after mapping the multiplexed first and second HARQ-ACK information onto the physical uplink channel and there being a remaining UCI, mapping a part of the remaining UCI onto the physical uplink channel.

11. A base station (BS) comprising:
at least one transceiver;
at least one processor; and
at least one computer memory operably connected to the at least one processor and configured to store instructions that, when executed, cause the at least one processor to perform operations comprising:
transmitting a configuration for multiple hybrid automatic repeat request (HARQ) process-based HARQ-acknowledgement (HARQ-ACK) codebooks including i) a first HARQ process-based HARQ-ACK codebook related to all HARQ processes configured for a user equipment (UE) and ii) a second HARQ process-based HARQ-ACK codebook related to a part of the HARQ processes configured for the UE;
transmitting a configuration for enabling multiplexing of uplink transmissions of different priorities to the UE;
transmitting scheduling information related to a first uplink channel for first HARQ-ACK information;
transmitting downlink control information including a request for second HARQ-ACK information to the UE;
determining a second uplink channel for the second HARQ-ACK information based on the downlink control information;
based on i) the first uplink channel and the second uplink channel overlapping in time and ii) the first HARQ-ACK information having a high priority:
not receiving the first HARQ-ACK information and receiving the second HARQ-ACK information, based on the second HARQ-ACK information being the first HARQ process-based HARQ-ACK codebook, and
receiving the second HARQ-ACK information multiplexed with the first HARQ-ACK information, based on the second HARQ-ACK information being the second HARQ process-based HARQ-ACK codebook, and
based on i) the first uplink channel and the second uplink channel overlapping in time and ii) the first HARQ-ACK information having a low priority:
not receiving the first HARQ-ACK information and receiving the second HARQ-ACK information, based on the second HARQ-ACK information being the first HARQ process-based HARQ-ACK codebook, and
receiving the second HARQ-ACK information multiplexed with the first HARQ-ACK information, based on the second HARQ-ACK information being the second HARQ process-based HARQ-ACK codebook.

12. The BS of claim 11, wherein the first and second HARQ process-based HARQ-ACK codebooks are considered to have the low priority irrespective of priority indicated for a HARQ process included in the first and second HARQ process-based HARQ-ACK codebooks.

13. The BS of claim 11, wherein the second HARQ-ACK information has a different priority from a priority of the first HARQ-ACK information.

14. The BS of claim 11, wherein, based on i) receiving the second HARQ-ACK information multiplexed with the first HARQ-ACK information and ii) a size of uplink control information (UCI) including the multiplexed first and second HARQ-ACK information being greater than a size of a UCI payload of a physical uplink channel for the multiplexed first and second HARQ-ACK information, the physical uplink channel includes the second HARQ-ACK information first, and a remaining space of the physical uplink channel other than a space used for the second HARQ-ACK information includes the first HARQ-ACK information.

15. The BS of claim 14, wherein, based on there being another remaining space of the physical uplink channel other than a space used for the first and second HARQ-ACK information and there being a remaining UCI, the physical uplink channel further includes a part of the remaining UCI.

* * * * *